US011508489B2

(12) United States Patent
Crichlow

(10) Patent No.: US 11,508,489 B2
(45) Date of Patent: Nov. 22, 2022

(54) GEOLOGIC DISPOSAL OF URANIUM WASTE PRODUCTS

(71) Applicant: Henry Crichlow, Norman, OK (US)

(72) Inventor: Henry Crichlow, Norman, OK (US)

( * ) Notice: Subject to any disclaimer, the term of this patent is extended or adjusted under 35 U.S.C. 154(b) by 120 days.

(21) Appl. No.: 17/103,641

(22) Filed: Nov. 24, 2020

(65) Prior Publication Data

US 2022/0165445 A1 May 26, 2022

(51) Int. Cl.
| | | |
|---|---|---|
| *B09B 1/00* | (2006.01) | |
| *G21F 9/30* | (2006.01) | |
| *G21F 9/36* | (2006.01) | |
| *G21F 9/24* | (2006.01) | |
| *G21F 5/005* | (2006.01) | |
| *G21F 5/002* | (2006.01) | |
| *G21F 5/06* | (2006.01) | |
| *E21B 41/00* | (2006.01) | |
| *E21B 7/28* | (2006.01) | |

(52) U.S. Cl.
CPC .............. *G21F 9/304* (2013.01); *B09B 1/008* (2013.01); *E21B 41/005* (2013.01); *G21F 5/002* (2013.01); *G21F 5/005* (2013.01); *G21F 5/06* (2013.01); *G21F 9/24* (2013.01); *G21F 9/36* (2013.01); *E21B 7/28* (2013.01)

(58) Field of Classification Search
CPC ... G21F 9/304; G21F 9/24; G21F 9/36; G21F 5/002; G21F 5/005; G21F 5/06; B09B 1/008; E21B 41/005
See application file for complete search history.

(56) References Cited

U.S. PATENT DOCUMENTS

| | | | |
|---|---|---|---|
| 4,192,765 A * | 3/1980 | Bird | ........................ G21F 5/005 976/DIG. 395 |
| 5,358,047 A | 10/1994 | Himes | |
| 5,835,548 A | 11/1998 | Lindgren | |
| 6,547,871 B2 | 4/2003 | Chatterjl | |
| 6,941,883 B2 | 9/2005 | Nguyen | |
| 6,951,249 B1 | 10/2005 | Chatterjl | |
| 7,008,477 B2 | 3/2006 | Chatterjl | |
| 7,191,834 B2 | 3/2007 | Lewis | |

(Continued)

FOREIGN PATENT DOCUMENTS

DE 102010017201 A1 * 9/2011 ............. G21F 5/002

*Primary Examiner* — Janine M Kreck
(74) *Attorney, Agent, or Firm* — Eric Kelly

(57) ABSTRACT

Steel and/or copper spherical capsules are specifically engineered and manufactured for housing uranium waste products. The uranium waste products are placed within the spherical capsules. Human-made cavern(s) and/or substantially lateral wellbore(s) are constructed for receiving the uranium waste containing spherical capsules. The human-made cavern(s) and/or the substantially lateral wellbore(s) are deeply located in specific types of geologic rock formations thousands of feet below the Earth's surface. These uranium waste containing spherical capsules are loaded from the Earth's surface into the human-made cavern(s) and/or into the substantially lateral wellbore(s). The emplaced spherical capsules are surrounded by an immersive protective medium within the given human-made cavern(s) and/or within the substantially lateral wellbore(s). The given human-made cavern(s) and/or the given substantially lateral wellbore(s), with the uranium waste containing spherical capsules, are sealed off.

19 Claims, 15 Drawing Sheets

(56) References Cited

U.S. PATENT DOCUMENTS

| | | |
|---|---|---|
| 8,030,253 B2 | 10/2011 | Roddy |
| 8,287,640 B2 | 10/2012 | Zamora |
| 8,592,352 B2 | 11/2013 | Karcher |
| 9,725,368 B2 | 8/2017 | Enzenhofer |
| 10,427,191 B2 | 10/2019 | Crichlow |
| 10,807,132 B2 | 10/2020 | Crichlow |
| 10,943,706 B2 * | 3/2021 | Muller .................... G21F 5/125 |
| 11,158,434 B2 * | 10/2021 | Payer ........................ G21F 9/24 |
| 11,183,313 B2 * | 11/2021 | Crichlow ................. G21F 9/304 |
| 2007/0290149 A1 * | 12/2007 | Wickland .................. G21F 5/00 |
| | | 250/506.1 |
| 2019/0295735 A1 * | 9/2019 | Crichlow ................. G21F 9/36 |

* cited by examiner

GEOLOGIC DISPOSAL OF URANIUM WASTE PRODUCTS

TECHNICAL FIELD OF THE INVENTION

The present invention relates generally to the disposing of hazardous uranium waste products and more particularly, the invention relates to the use of specially constructed waste-filled spheres or spherical capsules which may contain the waste and which may be deposited in deep geological repositories.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Today (circa 2020) there is a massive quantity of uranium materials and waste products accumulating across the world. For example, there is a significant amount of dangerous radioactive uranium hexafluoride ($UF_6$) which is a byproduct of the uranium enrichment industry. Uranium hexafluoride is a chemical compound used in the "front end" of the nuclear fuel cycle. Uranium hexafluoride is used in the nuclear conversion, enrichment, and fuel fabrication cycles.

At twenty (20) degrees Celsius and typical atmospheric pressures, $UF_6$ is a solid crystalline mass with a density of about 5.06 grams per cubic centimeter (g/cc). At and above its triple point, $UF_6$ exists in solid, liquid, and gaseous forms. Below its triple point, $UF_6$ is solid or gaseous in form. $UF_6$ is radioactive, deriving its radioactivity from the uranium component. Uranium is mainly an alpha and gamma radiation emitter. The radiation effect from $UF_6$ is generally considered to be minimal. For example, an individual standing next to a cylinder of $UF_6$ for two hours would receive less than the equivalent of one dental X-ray dosage of radiation.

Although $UF_6$ has low specific activity, it is still dangerous since on contact with moist air it produces corrosive and toxic products. It is for this reason that a safe permanent disposal system and process is required with respect to $UF_6$ and its derivatives.

Currently much of this $UF_6$ is accumulating in rusting steel cylinders on the ground across the U.S. and around the world. The current U.S. inventory is in excess of 700,000 metric tons (MT) of the $UF_6$ material (NRC data). The world inventory is in excess of 1,200,000 MT. There is a significant need for new mechanisms and processes to safely dispose of (or minimize) the current surface storage operations of this dangerous radioactive waste and to sequester the waste in a safe manner.

The following issues which have been raised with respect to nuclear waste in public hearings and environmental discussions must be analyzed, addressed, and contingencies made to provide for safety to the environment and humankind: (a) local and regional aquifer pollution problems in the case of leakage and filtration of surface and near surface waters; (b) the solubility of nuclear waste materials in water, especially saline water; (c) the long-term stewardship of nuclear wastes, including financial liability over a matter of decades; and/or the like.

In the case of the $UF_6$ there are also numerous problems which have yet to be overcome successfully before disposal of $UF_6$ can be considered safe and routine. $UF_6$ is very toxic. $UF_6$ can be a crystalline solid like rock salt. In storage cylinders the $UF_6$ may exist as solid salt at the bottom of the storage cylinder and a $UF_6$ gas above the solid phase at less than atmospheric pressure. To date, the problems to be resolved occur because the $UF_6$ is stored in surface or near surface facilities in tanks.

The insufficient $UF_6$ treatment alternatives used today are: (a) keep $UF_6$ in storage forever at the plants/facilities where produced (at or the Earth's surface); (b) long-term consolidated storage as $UF_6$ (e.g., storage as $UF_6$ cylinders in yards, buildings, or a mine at a consolidated site); (c) converting to oxides and keeping the converted products in storage in warehouses, below-ground vaults (but near surface), or a mine (near surface) at a consolidated site; and/or (d) some very limited commercial use of the converted $UF_6$ material which include radiation shielding, dense material applications other than shielding, and light water reactor and advance reactor fuel cycles (there may be other esoteric/minor uses for $UF_6$ in industry, but the total volumes needed are small compared to the available depleted metal supply).

A prior art, capsule technology approach that has been attempted to contain hazardous waste comprises the construction of a waste cylinder capsule by the slow electrolytic deposition of copper on a cylindrical steel container, which then becomes the final disposal receptacle of the waste. This prior art process has the following four steps: (a) setting up an electrolytic bath of copper sulfate; (b) lowering a 5 meter (196 inch) long, 90 centimeter (cm) (35.4 inch) diameter steel cylinder, into the electrolytic bath and holding immerse there for 50 days to provide a 50 millimeter (mm) (1.96 inch) layer of copper; (c) removing the copper plated steel cylinder from the bath and heating the cylinder at 750 degrees Celsius to 800 degrees Celsius for two (2) to three (3) hours; and (d) rapidly cooling the cylinder with liquid nitrogen and then introduce the nuclear waste into the cylinder. See also FIG. 8C and its discussion. This prior art method and system is cumbersome, slow, time-consuming, expensive and extremely difficult to scale up for the thousands of tons of waste material existing today.

To solve the above-described problems, the present invention provides devices, apparatus, mechanisms, systems, means, processes, and methods to dispose of the nuclear products currently accumulating on the Earth's surface (and/or near surface).

There is a long felt, but currently unmet, need for devices, apparatus, mechanisms, systems, means, processes, and methods that would allow the nuclear waste which exists in a variety of physical forms to be packaged and disposed of very deep within the Earth's crust, in specific types of rock formations, and in substantial quantities.

A need therefore exists, for new devices, apparatus, mechanisms, systems, means, processes, and methods to safely dispose of uranium wastes in a controlled manner and then depositing these wastes in a system that is designed to meet the requirements of public acceptance along with regulatory guidelines.

The novel and non-obvious approaches as taught in this subject patent application provide devices, apparatus, mechanisms, systems, means, processes, and methods wherein the waste forms are disposed of after packaging in a manner described herein.

It is to these ends that the present invention has been developed.

BRIEF SUMMARY OF THE INVENTION

To minimize the limitations in the prior art, and to minimize other limitations that will be apparent upon reading and understanding the present specification, the present invention describes devices, apparatus, mechanisms, systems, means, processes, and methods for the long-term disposal and/or storage of uranium waste materials (such as, but not limited to, uranium hexafluoride) within spherical capsules; wherein the spherical capsules are emplaced into deeply located lateral wellbores and/or within deeply located human-made caverns, wherein the lateral wellbores and/or the human-made caverns are located within deep geological rock formations.

In some embodiments, steel and/or copper spherical capsules are specifically engineered and manufactured for housing uranium waste products. In some embodiments, materials of construction, diameter, wall thickness, linings/coatings, and/or the like may be predetermined for a given a spherical capsule so that the given spherical capsule may house a particular amount and type of uranium waste and/or withstand a predetermined hydrostatic pressure (from an exterior immersive protective medium). In some embodiments, the uranium waste products are placed within the spherical capsules; however, the spherical capsules may not be completely filled, i.e., a gas cap may be left in the given spherical capsule. In some embodiments, human-made cavern(s) and/or substantially lateral wellbore(s) are constructed for receiving the uranium waste containing spherical capsules. In some embodiments, the human-made cavern(s) and/or the substantially lateral wellbore(s) are deeply located in specific type(s) of geologic rock formations thousands of feet below the Earth's surface. In some embodiments, these uranium waste containing spherical capsules are loaded from the Earth's surface into the human-made cavern(s) and/or into the substantially lateral wellbore(s). In some embodiments, the emplaced spherical capsules (with the uranium wastes within) are surrounded by the immersive protective medium within the given human-made cavern(s) and/or within the substantially lateral wellbore(s). In some embodiments, the given human-made cavern(s) and/or given the substantially lateral wellbore(s), with the uranium waste containing spherical capsules, are sealed off.

The waste containing spherical capsules may provide relatively short-term protection, such as, from 10,000 years to 100,000 years; but, the deeply located geologic rock formation repositories (that may house the spherical capsules) may provide long-term protection for hundreds of thousands of years to millions of years. Long-term protection of nuclear waste from the ecosphere may depend in part on the physical properties of the deeply located geological rock formation repository which have demonstrably been shown to have been undisturbed for millions of years by using radioisotope dating of the rock fluids in these deep geological zones.

It is an objective of the present invention that radioactive, nuclear, and/or uranium waste is encapsulated in a system that is capable of accommodating large volumes/amounts of the waste, is effective when implemented, can be scaled exponentially, and provide a degree of versatility for multiple types of waste forms.

It is another objective of the present invention to provide spherical capsules configured to house radioactive waste materials.

It is another objective of the present invention to provide spherical capsules with one or more valves for receiving radioactive waste materials.

It is another objective of the present invention to fill the spherical capsules with the radioactive waste materials to a predetermined less than full amount such that a gas cap is left within the given special capsule.

It is another objective of the present invention to surround the radioactive waste containing spherical capsules with an immersive protective medium.

It is another objective of the present invention to provide spherical capsules capable of resisting collapse from predetermined hydrostatic pressures.

It is another objective of the present invention to use foaming cements/slurries as an immersive protective medium to minimize hydrostatic pressures at the radioactive waste containing spherical capsules.

It is another objective of the present invention to build spherical capsule receiving repositories within deeply located geologic rock formations.

It is yet another objective of the present invention wherein the repositories take a form of at least one human-made cavern and/or of at least one substantially lateral wellbore; wherein the at least one human-made cavern and/or the at least one substantially lateral wellbore are located within the deep geologic rock formation.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 3B may also show a welding machine used in construction of a given sphere.

Figure 1A:
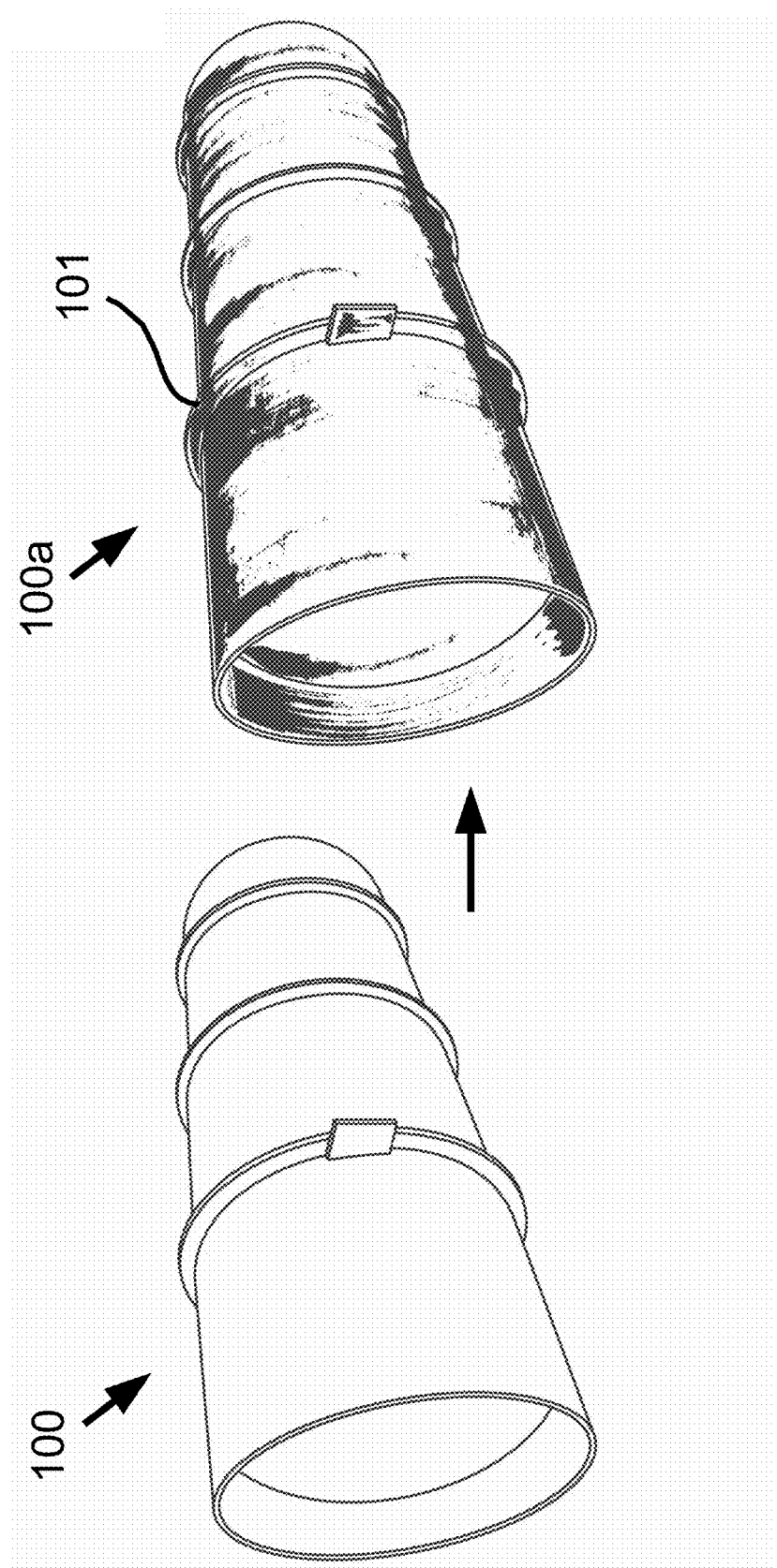
FIG. 1A shows two prior art steel storage cylinders (canister or drum) as conventionally used today for the storage and disposal of uranium hexafluoride ($UF_6$) on or near the Earth's surface.

REFERENCE NUMERAL SCHEDULE 100 new/clean surface waste storage container 100
100a rusted surface waste storage container 100a
101 rust 101
103 Earth's surface (surface of the Earth) 103
200 spherical waste storage/disposal capsule (sphere) 200
201 radioactive waste material 201
301 structural outer shell 301
303 protective inner layer 303
305 valve 305
307 weld (between outer shell elements) 307
309 gas cap or free zone 309
311 interface 311
313 outside weld 313
315 welding machine 315
317 direction of rotation of sphere 317
319 valve weld connection 319
321 valve inlet (material pathway) 321
323 valve screw connection 323
401 human-made cavern 401
403 large waste-filled sphere 403
405 small waste-filled sphere 405
407 immersive protective medium 407
501 wellbore 501
503 formation 503
505 drill rig 505
507 surface storage 507
509 connecting wellbore 509
511 lateral wellbore 511
513 strata 513
515 top of immersive medium 515
601 casing 601
603 cement 603
605 plug device 605
801 prior art waste cylinder 801
802 steel wall of prior art cylinder 802
803 copper wall of prior art cylinder 803
804 nuclear waste 804
805 setup copper sulfate electrolytic bath 805
806 immerse in electrolytic bath 806
807 heat cylinder 807
808 cool cylinder and load with waste 808
900 method of disposing of uranium using spheres 900
901 step of designing and/or manufacturing spheres 901
902 step of loading/filling waste into spheres 902
903 step of determining/selecting disposal type (wellbore or human-made cavern) 903
904 step of loading/emplacing spheres into human-made caverns 904
905 step of loading spheres/emplacing into lateral wellbores 905
906 step of selecting protective medium 906
907 list of immersive protective medium 907
908 step of loading/injecting protective medium into wellbores/human-made caverns 908
909 step of sealing/closing wellbores/human-made caverns 909

DETAILED DESCRIPTION OF THE INVENTION

A number of terms are used in connection with describing the present invention, and as a general rule are given functionally and/or structurally descriptive names; however, such terms are used to illustrate but not necessarily limit the possible meaning of such terms.

In this patent application, "radioactive material," "radioactive waste," "radioactive waste material," "nuclear material," "nuclear waste," "high-level nuclear waste," "uranium waste," and/or the like may be used interchangeably herein. The term "UF$_6$" refers to uranium hexafluoride and/or its derivatives.

In this patent application, "sphere," "spherical capsule," and/or the like may refer to a substantially (mostly) spherical shaped container configured for receiving at least some radioactive waste material therein.

In this patent application, "matrix rock," "host rock," "deep geologic formation," "geologic rock formation," "rock formation," "formation," "geological zone," and/or the like may be used interchangeably and may refer to a rock structure that may be located at a minimum depth from 2,000 feet to 15,000 feet, plus or minus 1,000 feet, from the Earth's surface (and that may extend further below the Earth's surface from that minimum depth). Such rock structures may have at least one human-made cavern and/or at least one substantially lateral wellbore located therein.

In this patent application, an "underground repository" is a human-made construction deep in the Earth in a specific deeply located geologic rock formation. Such underground repositories may comprise at least one wellbore and/or at least one human-made cavern. Such underground repositories may comprise at least one substantially vertical wellbore; at least one connecting wellbore; at least one substantially lateral wellbore; and/or at least one human-made cavern.

In this patent application, the terms "well" and "wellbore" may be used interchangeably and may refer to cylindrical drilled out elements implemented in design and/or installation processes of some embodiments of the present invention.

In this patent application, the terms "single wellbore," "common wellbore," "shared wellbore," and/or the like may refer to a wellbore that may be shared.

In this patent application, "vertical" as used in context with "vertical wellbore" may mean a wellbore that may be substantially parallel with a direction of a local gravitational vector at that well site. "Lateral" and/or "horizontal" in the context of wellbores may refer to wellbores with portions that are substantially orthogonal with vertical wellbore(s). Note, unless an explicit reference of "vertical wellbore" or "lateral wellbore" (i.e., "horizontal wellbore") accompanies "wellbore," use of "wellbore" herein without such explicit reference may refer to vertical wellbores or lateral wellbores, or both vertical and lateral wellbores.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

The novel and non-obvious features which are considered characteristic for embodiments of the present invention are set forth in the appended claims. Embodiments of the present invention itself, however, both as to construction and methods of operation, together with additional objects and advantages thereof, will be best understood from the following description of the specific embodiments when read and understood in connection with the accompanying drawings. Attention is called to the fact, however, that the drawings are illustrative only, and that changes may be made in the specific construction illustrated and described within the scope of the appended claims.

FIG. 1A is prior art. FIG. 1A shows two steel storage cylinders (canister or drum) as conventionally used today for the storage and disposal of uranium hexafluoride ($UF_6$) on or near the Earth's surface 103. These two steel storage cylinders are designed new/clean surface waste storage container 100 and rusted surface waste storage container 100a, respectively. Rusted surface waste storage container 100a generally has areas/regions of visible rust 101. Once a given new/clean surface waste storage container 100 is placed into use, it will become a given rusted surface waste storage container 100a. A given steel storage cylinder 100 and/or 100a is often about twelve (12) feet long, four (4) feet in diameter, and with a gross weight of about 14 tons (about 30,000 lbs. [pounds]). The storage cylinder steel 100 and/or 100a wall thickness is about 5/16 of an inch.

Figure 1B:
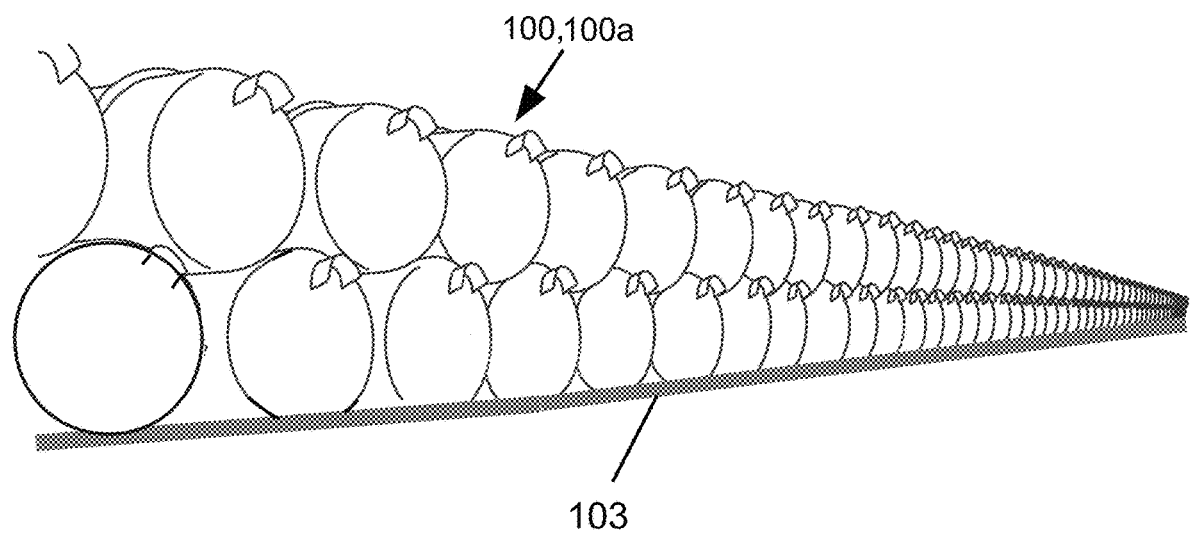
FIG. 1B shows some prior art steel storage cylinders in a stacked cord storage configuration on or near the Earth's surface.

Hundreds to thousands of these steel storage cylinder 100 and/or 100a are often stacked like "cord wood" in rows, two or three cylinders high, usually on a gravel base or in a warehouse at several locations around the world, at or near the earth's surface 103. See e.g., FIG. 1B, which is also prior art. FIG. 1B shows some prior art steel storage cylinders 100 and/or 100a in a stacked cord storage configuration. Such surface or near surface large storage sites are distributed nationally in the United States (US). In such surface storage locations and conditions, steel storage cylinders 100 and/or 100a are susceptible to environmental elements (such as, but not limited to, moisture, air, water, oxidation, rust, corrosive gases, and/or the like) and to security threats (such as, but not limited to, theft). In several published reports, rusted surface waste storage container 100a exteriors are shown to have rusted and are rapidly deteriorating because of moisture, ground contamination, polluted air, oxidation, and/or other ambient problems. Moving these rusted and/or deteriorating rusted surface waste storage container 100a is very dangerous. Breakage and/or rupture of rusted surface waste storage container 100a can lead to leakage of $UF_6$ into the environment and of radiation contamination of the environment.

A given steel storage cylinder 100 and/or 100a often contains between 800 liters and 8,000 liters capacity of dangerous radioactive $UF_6$ material. The steel storage cylinders 100 and/or 100a capacities also vary by country of origin and/or manufacturer. In the US, steel storage cylinder 100 and/or 100a holding volumes are between 4,000 liters and 8,000 liters capacity.

Figure 2:
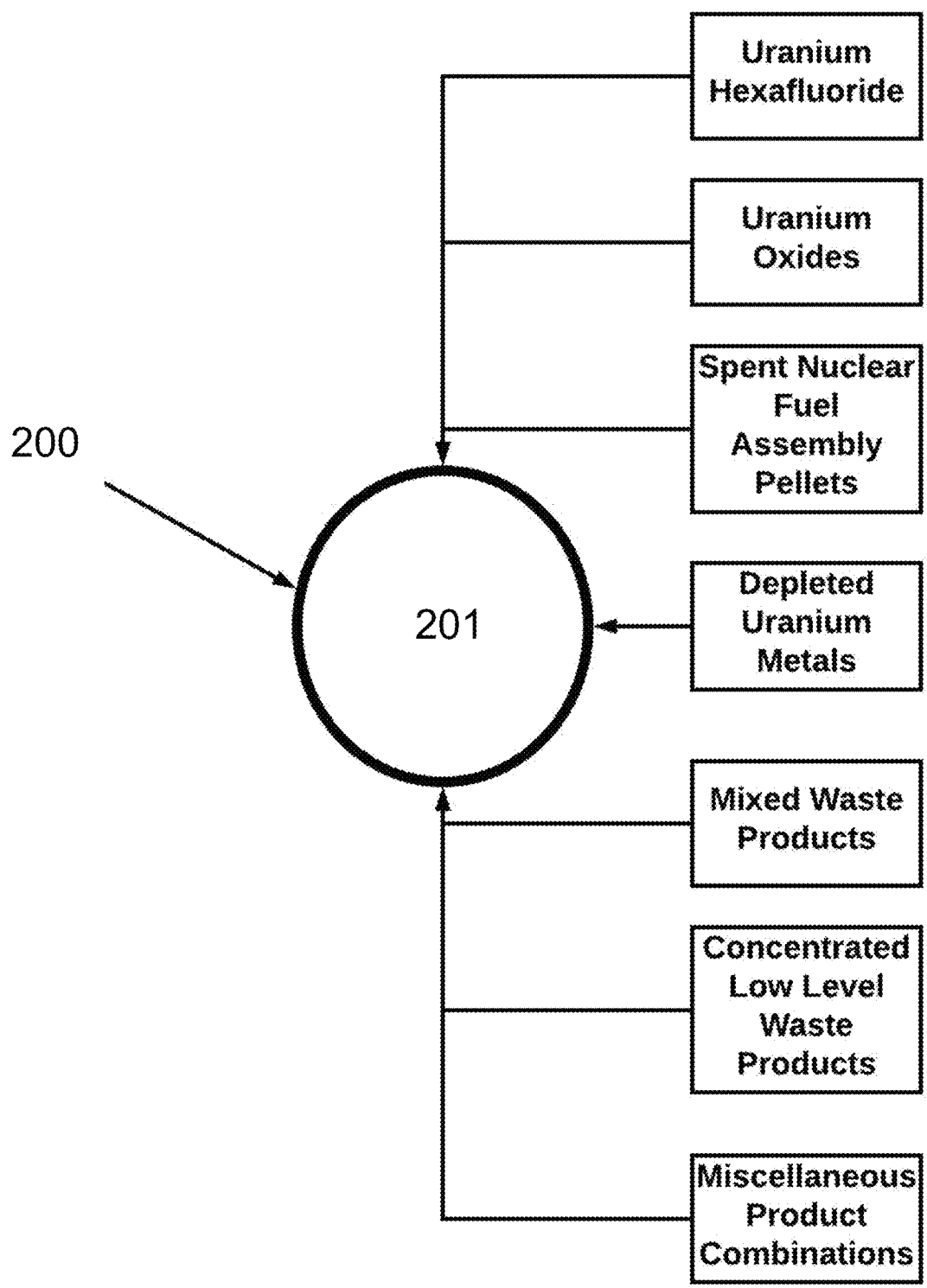
FIG. 2 may depict a schematic diagram of a given (substantially) spherical waste storage/disposal capsule, referred to herein as a sphere; wherein such spheres are configured for housing radioactive waste materials.

FIG. 2 may depict a schematic diagram of a given (substantially) spherical waste storage/disposal capsule 200, referred to herein as sphere 200. In some embodiments, sphere 200 may be rigid to substantially rigid. In some embodiments, sphere 200 may be a given fixed and a non-variable (and predetermined) size (e.g., diameter and/or volume). In some embodiments, sphere 200 may be at least mainly structurally comprised of at least one metal. In some embodiments, the spherical shape of a given sphere 200 may have at least one advantage, such as, but not limited to: (a) a largest container volume for a given amount of surface area of material or mass of material used to construct the given container; (b) ease of loading a spherical body in a cylindrical wellbore; (c) ability of a spherical body to "roll" in any three-dimensional direction without jamming or becoming obstructed catching edges or flat edges; (d) a non-obtrusive shape with no edges and no flat surfaces; (e) no localized hydrostatic pressure concentration points when immersed in a fluid medium; (0 relative ease of manufacturing in great quantities because of large worldwide demands for similar spherical bodies, such as, small propane tanks, high pressure gas "bottles," and LPG (liquified petroleum gas) tanks. In some embodiments, sphere 200 may be constructed and manufactured by existing techniques available in the metal fabricating industries.

Continuing discussing FIG. 2, in some embodiments, a given sphere 200 may comprise radioactive waste material 201. In some embodiments, a given sphere 200 may be configured to house, hold, receive, contain, store, and/or the like, radioactive waste material 201. In some embodiments, radioactive waste material 201 may be sealed within a given sphere 200. In some embodiments, a particular (and predetermined) amount of radioactive waste material 201 may be sealed within a given sphere 200. In some embodiments, the radioactive waste material 201 (within a given sphere 200) may be a of specific, particular, and/or predetermined type. In some embodiments, the specific, particular, and/or predetermined type of radioactive waste material 201 may be one or more of: uranium hexafluoride ($UF_6$); uranium oxide; spent nuclear fuel assembly pellets; depleted uranium metals; mixed waste products; concentrated low-level waste products; solid waste; pellet waste; granules waste; fine solids waste; powder waste; particulate waste; ceramic waste; glass waste; liquid waste; gel waste; portions thereof; combinations thereof; and/or the like. Mixed waste products may generally refer to those waste products that have a hazardous waste component regulated under the Resource Conservation and Recovery Act of the EPA (RCRA). These mixed waste products are usually byproducts of the reprocessing of radioactive materials and contain fission products. Concentrated low-level waste products may be defined as those low-level waste products that usually remain at the bottom of waste storage tanks after as much of the radioactivity as possible has been economically removed or separated from the tank contents. Concentrated low-level waste products may still have some radioactivity.

FIG. 2 illustrates that one or more of the specific, particular, and/or predetermined types of radioactive waste material 201 may be housed, held, received, contained, stored, and/or the like in a given sphere 200. In some embodiments, the uranium hexafluoride (or other uranium waste form) may be emplaced in the spheres 200 as a crystalline solid 201 with a gas cap (or free zone) 309 above the crystalline solid phase 201. In some embodiments, the gas zone 309 may allow for expansion of the uranium hexafluoride mass and/or pressure in the given sphere 200 during storage and/or disposal. That is, within a given sphere 200 there may be two volumes, separated by interface 311; a volume (e.g., "predetermined capacity") for solids and/or liquids and gas cap 309 (or free zone 309 or predetermined free volume 309) for gasses.

Compared to the prior art steel storage cylinders 100 and/or 100a, a twelve (12) inch inner diameter sphere 200 (sphere 405) may hold about 15 liters capacity (of radioactive waste material 201) and an eighteen (18) inch inner diameter sphere 200 (sphere 403) may hold about 50 liters (of radioactive waste material 201). In practice, one hundred and sixty (160), eighteen (18) inch, spheres 200 would be equivalent to a single 8,000 liter steel storage cylinder 100 and/or 100a. Such a chain of spheres 200 (with radioactive waste material 201) could extend about 240 feet linearly in a wellbore (such as, but not limited to a given lateral wellbore 511). In addition, a "minimum enclosing circle" calculation may be made to determine what optimal size, or size combination of spheres 200 may be contained within a given diameter of human-made cavern 401. This type calculation may allow for optimal packing of different sizes of spheres 200.

Spheres 200 may promote easier loading and/or unloading operations within wellbores (e.g., 501 and/or 511) and/or within human-made-cavern(s) 401, as spheres 200 may minimal to no flat spots, sharp edges, and/or the like to get stuck on interior surfaces of wellbores, casings, and/or human-made-cavern(s) 401. For example, sphere 200 readily roll with ease.

Figure 3A:
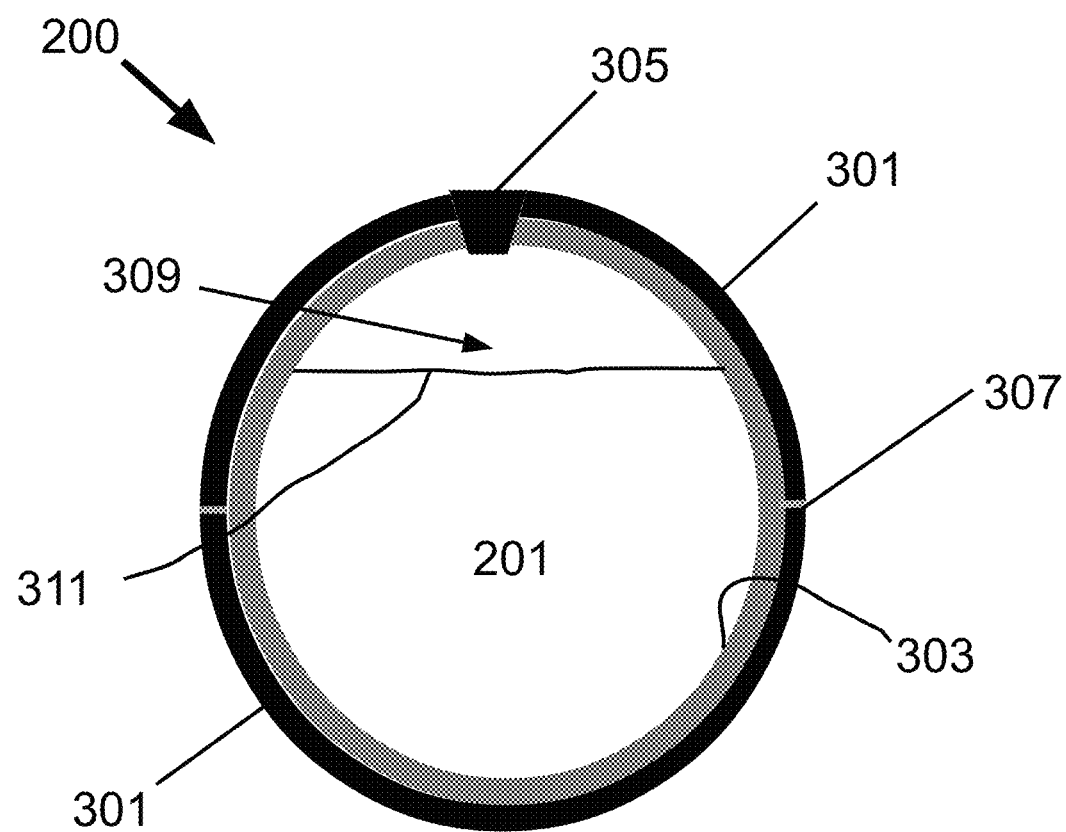
FIG. 3A may depict a schematic cross-section through a given sphere with radioactive waste material therein.

FIG. 3A may depict a schematic cross-section through a given sphere 200 with radioactive waste material 201 therein. In some embodiments, sphere 200 may comprise layered elements. In some embodiments, sphere 200 may comprise structural outer shell 301 and protective inner layer 303. In some embodiments, structural outer shell 301 and protective inner layer 303 may be substantially concentric/nested with respect each other. In some embodiments, protective inner layer 303 may be centered and disposed within structural outer shell 301. In some embodiments, structural outer shell 301 may be a sphere to substantially (mostly) spherical in shape. In some embodiments, structural outer shell 301 may be hollow/void to substantially (mostly) hollow/void. In some embodiments, for a given sphere 200, structural outer shell 301 may be larger than protective inner layer 303. In some embodiments, structural outer shell 301 may be an exterior/outside of sphere 200. In some embodiments, protective inner layer 303 may be an interior/inside of sphere 200. In some embodiments, structural outer shell 301 may be at least one structural layer of sphere 200 providing at least some structural strength of sphere 200. In some embodiments, this structural outer shell 301 may be at least mostly constructed of stainless steel and/or steel alloys which provide the necessary and/or the desired strength to withstand the hydrostatic and loading forces acting on the spheres 200 in the underground repositories 503.

Continuing discussing FIG. 3A, in some embodiments, protective inner layer 303 may be at least one layer of a given metal and/or metal alloy that is easy to use, machine, and/or that may have long term corrosion resistance under adverse environmental conditions, such as, but not limited to copper and/or copper alloys. In some embodiments, protective inner layer 303 may be at least one layer of some durable metal like copper, copper alloy, and/or the like material. In some embodiments, protective inner layer 303 may be at least one ceramic layer. In some embodiments, protective inner layer 303 may be a sphere to substantially (mostly) spherical in shape. In some embodiments, protective inner layer 303 may be hollow/void to substantially (mostly) hollow/void. In some embodiments, protective inner layer 303 may be commercially produced in great quantities, rapidly, and relatively inexpensively today. In some embodiments, protective inner layer 303 may be between one quarter (¼) inch to one half (½) inch in thickness, plus or minus one sixteenth (¹⁄₁₆) inch; while, structural outer shell 301 may be from three eights (⅜) inch to three quarters (¾) inch in thickness, plus or minus one sixteenth (¹⁄₁₆) inch.

Commercial manufacturing of such spheres 200 may be automated to mostly/significantly automated as shown by current ongoing liquid petroleum gas (LPG) tank manufacturing, high pressure cylinder manufacturing and other well-developed systems of capsule and container manufacturing industries in which several thousand metallic body items are manufactured daily.

In some embodiments, waste capsule spheres 200 may be made in a multiplicity of fixed but different sizes. This variation in sphere 200 sizes may allow many different sizes of spheres 200 to be packed more effectively in a given fixed volumetric space. The porosity or left open free space or void space in a given human-made cavern 401 that may house a plurality of such spheres 200 may this void space decreased and/or minimized if multiple different sizes of spheres 200 are used in packing that human-made cavern 401. Such difference in spheres 200 sizing may allow a larger total volume of radioactive waste materials 201 which may be stored in a given human-made cavern 401. In some embodiments, a given sphere 200 size (which may be fixed and non-variable for that particular sphere 200) may be selected from a range of six (6) inches to eighteen (18) inches in diameter, plus or minus one (1) inch.

Continuing discussing FIG. 3A, in some embodiments, a given sphere 200 may comprise at least one valve 305. In some embodiments, valve 305 may be configured for loading (and/or unloading) of radioactive waste material 201 with respect to the interior of that given sphere 200. In some embodiments, valve 305 may be implemented to provide entry of radioactive waste material 201 into the interior void space of a given sphere 200. In some embodiments, a given valve 305 may be specially designed and constructed for use with uranium hexafluoride (UF$_6$) products and/or other nuclear waste forms. In some embodiments, valve 305 may be in physical communication with structural outer shell 301 and/or with protective inner layer 303. In some embodiments, valve 305 may bisect structural outer shell 301 and/or protective inner layer 303. In some embodiments, valve 305 may pass through structural outer shell 301 and/or through protective inner layer 303. In some embodiments, valve 305 may be disposed within structural outer shell 301 and/or within protective inner layer 303. In some embodiments, valve 305 may be accessed from structural outer shell 301 and/or from protective inner layer 303. In some embodiments, at least a portion of valve 305 may be on an exterior of structural outer shell 301; and/or another different portion of valve 305 may be on an interior of protective inner layer 303. In some embodiments, a given valve 305 may be made available in a fixed and non-variable size selected from a range of one half (½) inch to one and one half (1.5) inch nominal sizes. As discussed later, a given valve 305 may be implemented in a given sphere 200 in a variety of ways.

Continuing discussing FIG. 3A, in some embodiments, sphere 200 may comprise one or more welds 307. In some embodiments, welds 307 may be welds between different segments, sections, portions, and/or regions of structural outer shell 301. In some embodiments, structural outer shell 301 may be comprised of various sections, portions, and/or regions that via welds 307 may form a single intact structural outer shell 301.

Continuing discussing FIG. 3A, in some embodiments, sphere 200 may be filled with a predetermined quantity, volume, and/or amount of radioactive waste material 201 such that sphere 200 comprises a gas cap or free zone 309. As gas cap or free zone 309 may be less dense than the at least mostly solid/liquid radioactive waste material 201 within sphere 200, gas cap or free zone 309 may move and orient itself to be a top of the inner volume of that given sphere 200 with respect to a gravitational field (and/or acceleration) acting on that given sphere 200. In some embodiments, interface 311 may designate a boundary layer between gas cap or free zone 309 and the at least mostly solid/liquid radioactive waste material 201 within the given sphere 200. In some embodiments, gas cap or free zone 309 may be gas filled. In some embodiments, gas cap or free zone 309 may allow the at least mostly solid/liquid waste material 201 within the given sphere 200 to expand or decrease as thermal and pressure conditions affect the sphere 200 in its final disposal location or during a transit process to the disposal repository in the given formation 503. In some embodiments, gas cap or free zone 309 may work as an internal cushion or a "shock absorber" preventing or minimizing excessive pressure buildup in the given sphere 200 and thus minimizing the potential for subsequent rupture, breach, and/or leakage of that given sphere 200. That is, within a given sphere 200 there may be two volumes, separated by interface 311; a volume (e.g., "predetermined capacity") for solids and/or liquids and gas cap 309 (or free zone 309 or predetermined free volume 309) for gasses. In some embodiments, the predetermined capacity (volume for liquids and/or solids) is less than 100 percent capacity of a given sphere 200. In some embodiments, the predetermined capacity being less than 100 percent may generate the predetermined free volume 309 (gas cap 309 or free zone 309) within the given sphere 200 that may be configured for holding gas. In some embodiments, the predetermined free volume 309 (gas cap 309 or free zone 309) may be less than the predetermined capacity. In some embodiments, the predetermined capacity may be ninety (90) percent and predetermined free volume 309 (gas cap 309 or free zone 309) may be ten (10) percent, with respect to a total internal volume of a given sphere 200. See FIG. 3A.

Figure 3B:
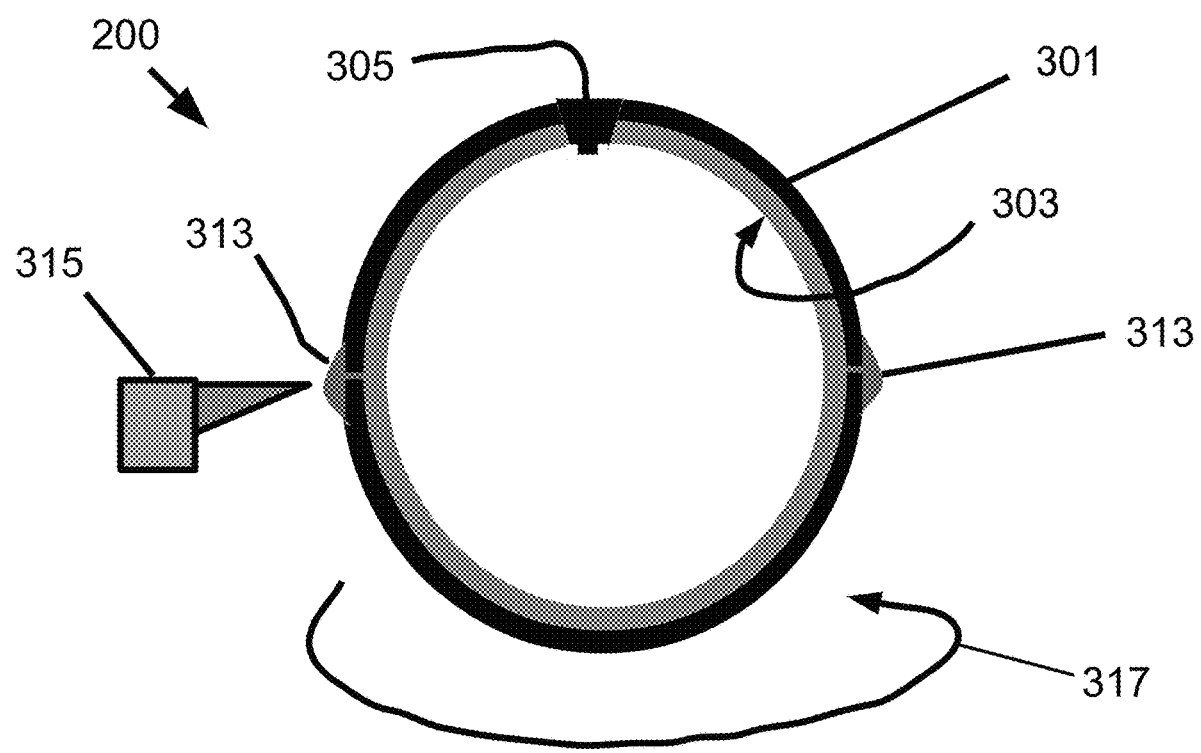
FIG. 3B may depict a schematic cross-section of a sphere configured for housing radioactive waste material therein.

FIG. 3B may depict a schematic cross-section of sphere 200. FIG. 3B may depict a metal welding construction process for forming a given sphere 200. In some embodiments, a given sphere 200 may be comprised of various parts, section, regions, and/or portions that may be metal welded together to form the given sphere 200. For example, and without limiting the scope of the present invention, the given sphere 200 may be formed from hemispheres metal welded together. In some embodiments, a given structural outer shell 301 may be comprised of various parts, section, regions, and/or portions that may be metal welded together to form the given structural outer shell 301. For example, and without limiting the scope of the present invention, the given structural outer shell 301 may be formed from hemispheres metal welded together. In some embodiments, a given protective inner layer 303 may be comprised of various parts, section, regions, and/or portions that may be metal welded together to form the given protective inner layer 303. For example, and without limiting the scope of the present invention, the given protective inner layer 303 may be formed from hemispheres metal welded together. In some embodiments, such metal welding may be accomplished by use of welding machine 315 (welder 315). In some embodiments, welder 315 may form one or more outside (exterior) weld(s) 313 and/or weld(s) 307. In some embodiments, in practice this metal welding process may be at least substantially automated and either welder 315 and/or sphere 200 may be rotated together or singly to speed up this metal welding process. In some embodiments, a direction of rotation for such metal welding may be denoted by reference numeral 317 in FIG. 3B.

Figure 3C:
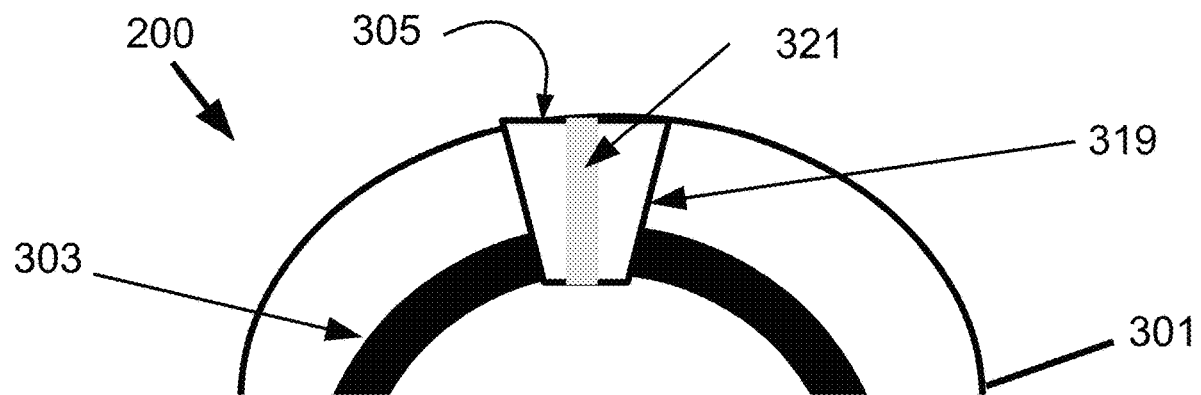
FIG. 3C may depict a schematic cross-section through a portion of a given sphere, wherein that portion includes at least one valve.

FIG. 3C may depict a schematic cross-section through a portion of a given sphere 200, wherein that portion includes at least one valve 305. In some embodiments, at least one valve 305 may be implemented in a body of a given sphere 200. In some embodiments, at least some exterior side portions of valve 305 may be welded to components, parts, portions, and/or regions of sphere 200; wherein these welded exterior side portions of valve 305 may be denoted as valve weld connection(s) 317 in FIG. 3C. In some embodiments, valve 305 may comprise inlet 321 or material pathway 321. In some embodiments, inlet 321 or material pathway 321 may be a closeable/sealable pathway through valve 305 configured to permit passage of radioactive waste material 201. In some embodiments, inlet 321 or material pathway 321 may allow radioactive waste material 201 to be loaded (and/or unloaded) into sphere 200. In some situations, such as for solid form and/or powder form of radioactive waste material 201, valve 305 may behave as an injector port to introduce these radioactive waste materials 201 into spheres 200. Such injection port loading is well documented today.

Figure 3D:
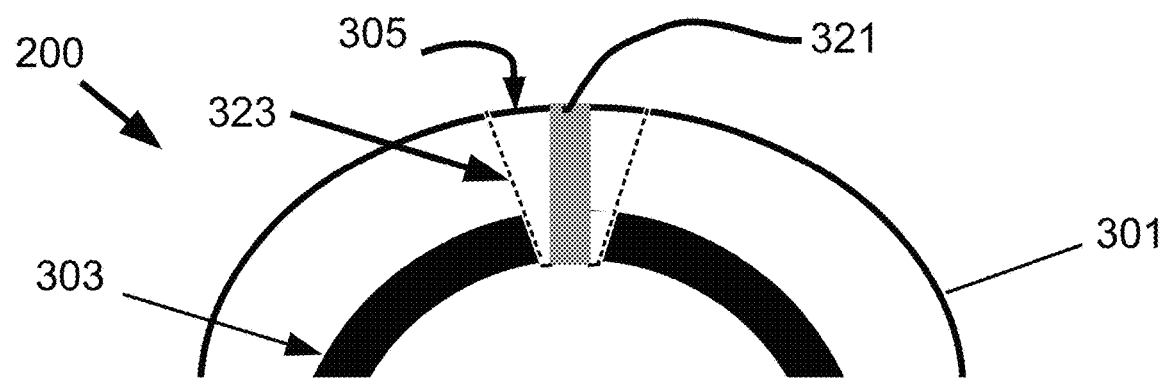
FIG. 3D may depict a schematic cross-section through a portion of a given sphere, wherein that portion includes at least one valve.

FIG. 3D may depict a schematic cross-section through a portion of a given sphere 200, wherein that portion includes at least one valve 305. In some embodiments, at least some exterior side portions of valve 305 may be threaded to be received into a complimentary threaded hole of sphere 200; wherein these threadings may be denoted as valve screw connection 323 in FIG. 3C. Both types of valve connections (e.g., welded connection of FIG. 3C and/or threaded connection of FIG. 3D) are widely available in the industry today. FIG. 3D also shows inlet 321 or material pathway 321 of valve 305.

In some embodiments, each spherical capsule 200 selected from a plurality of spherical capsules 200 may be comprised of structural outer shell 301, protective inner shell 303, and at least one valve 305. In some embodiments, structural outer shell 301 may be at least partially made from a steel (and/or a steel alloy). In some embodiments, protective inner layer 303 may be at least partially made from copper and/or a copper alloy. In some embodiments, the at least one valve 305 may be utilized in a step 902 (e.g., of method 900), wherein the at least one valve 305 may provide a pathway 321 from an exterior of the spherical capsule 200 to an interior of the spherical capsule 200, for loading/filling the given sphere 200 with radioactive waste material 201.

Figure 4:
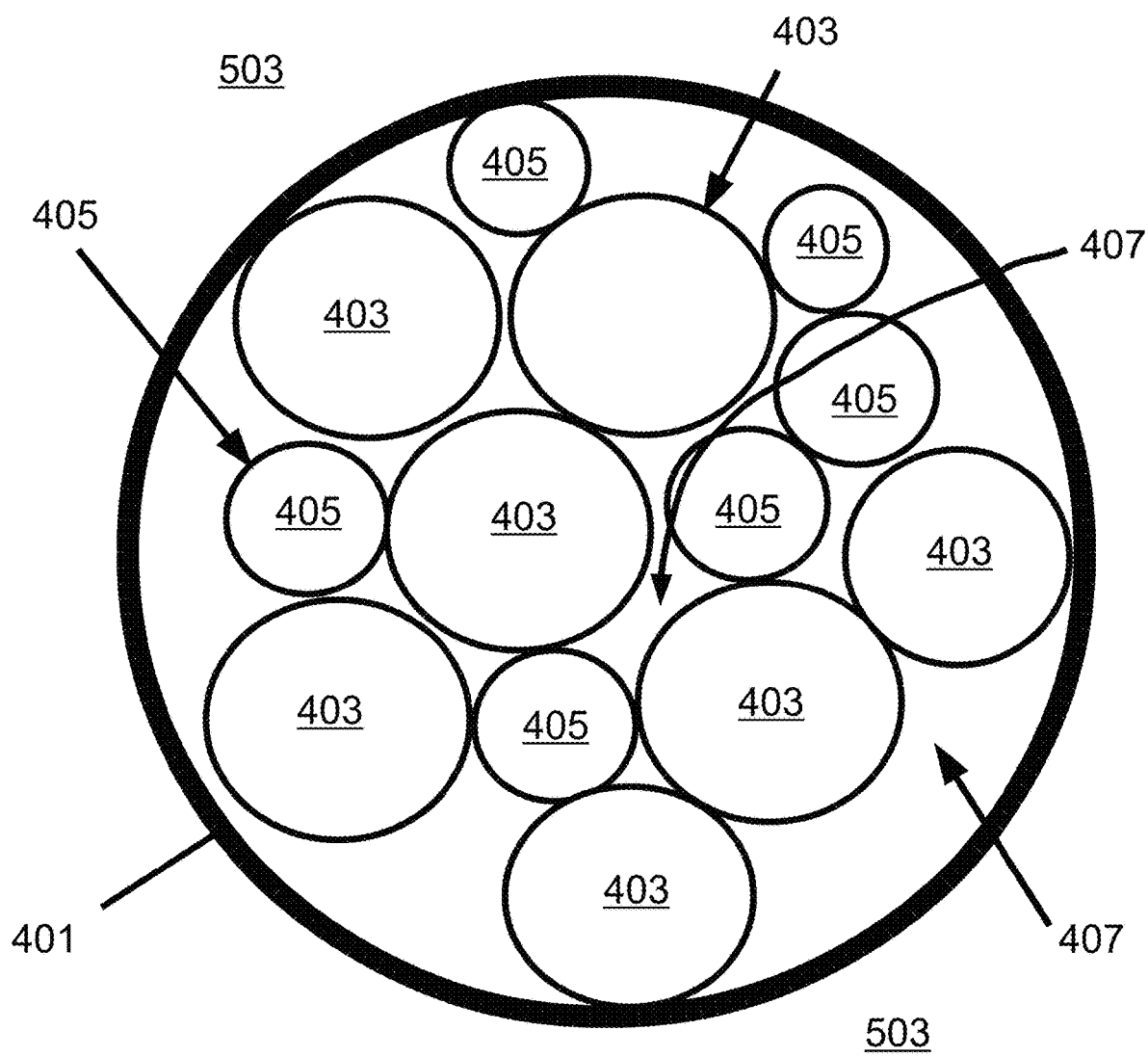
FIG. 4 may depict a schematic transverse width/diameter cross-section through a given human-made cavern with spheres disposed therein.

FIG. 4 may depict a schematic transverse width/diameter cross-section through a given human-made cavern 401 (not shown to scale). In comparison, longitudinal cross-sections through human-made caverns 401 are shown in FIG. 5A through FIG. 5D. In some embodiments, a given human-made cavern 401 may be substantially right cylindrical in overall shape. In some embodiments, a given human-made cavern 401 may be formed by under reaming operations of a given wellbore (e.g., a given wellbore 501 and/or a given connecting wellbore 509). In some embodiments, a given human-made cavern 401 may be located within a given formation 503. In some embodiments, disposed within a given human-made cavern 401 may be at least one sphere 200. In some embodiments, disposed within a given human-made cavern 401 may be one or more spheres 200. In some embodiments, disposed within a given human-made cavern 401 may be a plurality of spheres 200. In some embodiments, sphere(s) 200 may be loaded from the Earth's surface 103 by mechanical and/or gravity means into the given human-made cavern 401. In some embodiments, at least some of sphere(s) 200 within a given human-made cavern 401 may have radioactive waste material 201 within such sphere(s) 200. In some embodiments, the plurality of spheres 200 that may be disposed within the given human-made cavern 401, may be of at least two different sizes of spheres 200, namely large waste-filled sphere(s) 403 and small waste-filled sphere(s) 405, respectively. In some embodiments, large waste-filled sphere 403 and/or small waste-filled sphere 405 may be types of spheres 200. In some embodiments, large waste-filled sphere 403 and/or small waste-filled sphere 405 may be constructed and/or manufactured as a sphere 200. In some embodiments, large waste-filled sphere 403 and/or small waste-filled sphere 405 may be constructed and/or manufactured of the same materials (e.g., metals) as a given sphere 200. In some embodiments, large waste-filled sphere 403 and/or small waste-filled sphere 405 may have components and/or layers as in a given sphere 200. In some embodiments, the designations of "large" and "small" of large waste-filled sphere 403 and small waste-filled sphere 405, respectively, may be with respect to each other. In some embodiments, a diameter of large waste-filled sphere 403 may be larger than a diameter of small waste-filled sphere 405. In some embodiments, a diameter of small waste-filled sphere 405 may be smaller than a diameter of large waste-filled sphere 403. In some embodiments, a diameter of a given sphere 200, of a given large waste-filled sphere 403, or of a given small waste-filled sphere 405 may be fixed, static, and/or non-variable.

Continuing discussing FIG. 4, in some embodiments, disposed within the given human-made cavern 401 may be immersive protective medium 407. In some embodiments, immersive protective medium 407 may substantially fill in otherwise void spaces around sphere(s) 200 within a given human-made cavern 401. In some embodiments, immersive protective medium 407 may be configured to protect sphere(s) 200 within a given human-made cavern 401 from corrosion, pressure effects and changes, and other deteriorating processes which may occur in the given human-made cavern 401 over geological timeframes. In some embodiments, immersive protective medium 407 may be one or more of the following materials: carbon nanotubes; bentonite clays; bentonite fluids; tars; bitumen; heavy oils; regular cement slurries; specialized cement slurries; foam; foam slurries; foamed cement slurries; foam cement; retarders, accelerators, portions thereof; combinations thereof; and/or the like. In some embodiments, a given foam cement slurry 407 may have a density selected from a range of 0.4 grams per cubic centimeters (g/cc) to 1.2 g/cc. In some embodiments, forming a given foam cement slurry 407 may entail mixing a given cement slurry with a given gas to form the given foam cement slurry 407. In some embodiments, this gas may be nitrogen. In other embodiments, other gasses may be used or a different gas may be used.

Figure 5A:
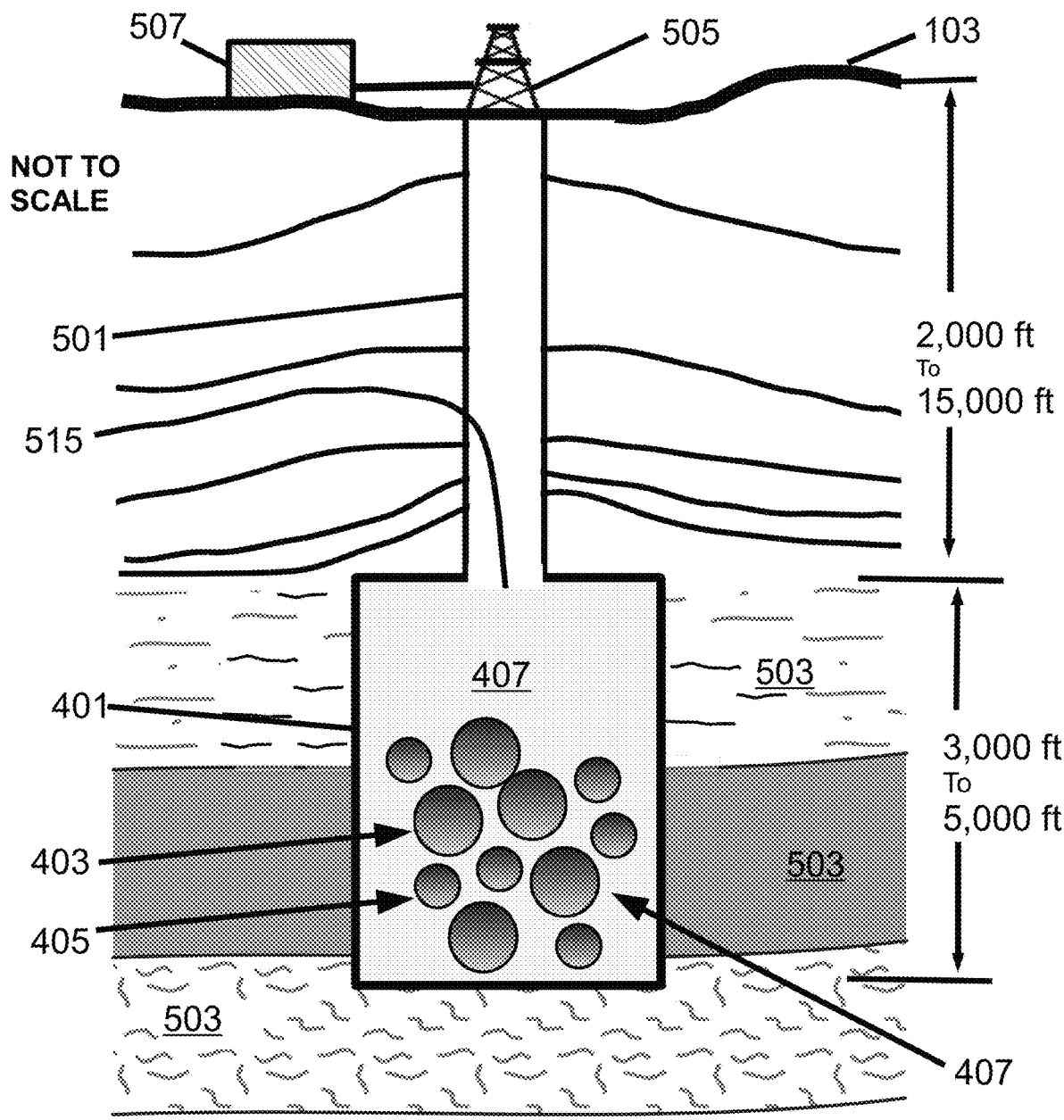
FIG. 5A may depict a schematic cross-section of a system for storing and/or disposing of radioactive waste material within sphere(s), wherein such radioactive waste material containing sphere(s) are disposed within at least one human-made cavern, and the at least one human-made cavern is located within a given deep rock formation.

FIG. 5A may depict a schematic cross-section of a system for storing and/or disposing of radioactive waste material 201 within sphere(s) 200, wherein such radioactive waste material 201 containing sphere(s) 200 are disposed within at least one human-made cavern 401, and the at least one human-made cavern 401 is located within a given formation 503. FIG. 5A may not be to scale. In some embodiments, a substantially vertical wellbore 501 may be drilled from the Earth's surface 103 to formation 503 using a drill rig 505 located at a drill site on the Earth's surface 103. In some embodiments, a distal portion of that substantially vertical wellbore 501 (e.g., distal from Earth's surface 103) may be under-reamed into formation 503 to form the given human-made cavern 401. In some embodiments, in practice wellbore 501 and/or human-made cavern 401 may be drilled and/or under-reamed using air and/or foam as the drilling fluid. Air drilling and/or foam drilling are well-established in the oil field drilling industries and they may be implemented relatively rapidly to drill a given vertical wellbore 501 and/or to under-ream to form a given human-made cavern 401. In some embodiments, "vertical" in this context may be substantially parallel with a direction of a local gravitational vector at that well site. In some embodiments, wellbore 501 may communicatively link human-made cavern 401 to the Earth's surface 103 at the drill site and/or to drill rig 505. In some embodiments, wellbore 501 may provide a safe pathway for loading sphere(s) 200 (with the radioactive waste material 201) into the given human-made cavern 401 from the Earth's surface 103. In some embodiments, wellbore 501 may be fixed, static, and/or non-variable, with respect to diameter, width, and/or length of wellbore 501. In some embodiments, a given diameter wellbore 501 may be selected from a range of fifteen (15) inches to thirty-six (36) inches, plus or minus three (3) inches. Such diameter sizes for wellbore 501 may permit ease of transit of a variety of sphere 200 diameters sizes. In some embodiments, there may be at least one dedicated wellbore 501 per a given human-made cavern 401.

Continuing discussing FIG. 5A, in some embodiments, formation 503 may be a deeply located geological rock formation. In some embodiments, formation 503 may be an igneous rock (like granite), a metamorphic rock, a tight shale, portions thereof, combinations thereof, and/or the like. FIG. 5A may show various different strata 513 below the Earth's surface 103. In some embodiments, formation 503 may be located at a minimum depth from 2,000 feet to 15,000 feet, plus or minus 1,000 feet, from the Earth's surface 103 (and then may extend further below the Earth's surface 103 from that minimum depth). In some embodiments, a given human-made cavern 401 may be located within a given formation 503. In some embodiments, wellbore 501 may have a fixed, static, and/or non-variable length from the Earth's surface 103 to formation 503 and/or to human-made cavern 401. In some embodiments, a given human-made cavern 401 may have a fixed, static, and/or non-variable (vertical) length. In some embodiments, a given human-made cavern 401 may have a fixed, static, and/or non-variable (vertical) predetermined length. In some embodiments, a given human-made cavern 401 may have a fixed, static, and/or non-variable (vertical) length selected from a range of 3,000 feet to 5,000 feet, plus or minus 100 feet. In some embodiments, a length of human-made cavern 401 may be other predetermined lengths.

Continuing discussing FIG. 5A, in some embodiments, drill rig 505 (at the drill site on the Earth's surface 103) may be used to: operate drilling equipment to form wellbore 501; to operate under-reaming equipment to form a human-made cavern 401; to facilitate loading (or unloading) of sphere(s) 200 (with the radioactive waste material 201 therein) into (or out of) the given human-made cavern 401 through wellbore 501; portions thereof; combinations thereof; and/or the like.

FIG. 5A may also show surface storage facility 507. In some embodiments, surface storage facility 507 may be located on or proximate to the Earth's surface 103. In some embodiments, surface storage facility 507 may be located near, adjacent, or proximate to the drill site and/or drill rig 505. In some embodiments, surface storage facility 507 may be in communication with drill rig 505. In some embodiments, surface storage facility 507 may house and/or store: equipment for drilling out wellbore 501; equipment for under-reaming human-made cavern 401; equipment for loading (or unloading) sphere(s) 200 into (or out of) human-made cavern 401; pumping equipment; sphere(s) 200 (with or without radioactive waste material 201); radioactive waste material 201; immersive protective medium 407; new/clean surface waste storage container 100; rusted surface waste storage container 100a; portions thereof; combinations thereof; and/or the like. In some embodiments, surface storage facility 507 may be used to take radioactive waste material 201 from new/clean surface waste storage container 100 and/or rusted surface waste storage container 100a and fill and seal that radioactive waste material 201 into spheres 200.

Continuing discussing FIG. 5A, in some embodiments, a given human-made cavern 401 may comprise a plurality of spheres 200. In some embodiments, the spheres 200 that may make up the plurality of spheres 200 may be of at least two different fixed diameters. In some embodiments, the plurality of spheres 200 may comprise at least one large waste-filled sphere 403 and at least one small waste-filled sphere 405. In some embodiments, the plurality of spheres 200 may be packed in the given human-made cavern 401. In some embodiments, spheres 200, the at least one large waste-filled sphere 403, and/or the at least one small waste-filled sphere 405 may be loaded from the Earth's surface 103 drill site location by mechanical and/or gravitational means operated and/or controlled via drilling rig 505 which may facilitate loading the spheres 200, the at least one large waste-filled sphere 403, and/or the at least one small waste-filled sphere 405, in selected batches, via the substantially vertical wellbore 501 into the given human-made cavern 401.

Continuing discussing FIG. 5A, in some embodiments, immersive protective medium 407 may be in the given human-made cavern 401 and dispersed around the spheres 200, the at least one large waste-filled sphere 403, and/or the at least one small waste-filled sphere 405 that may also be disposed within that given human-made cavern 401. FIG. 5A may show a top 515 of immersive protective medium 407 within that given human-made cavern 401. In some embodiments, immersive protective medium 407 may be filled, injected, pumped, inserted, landed, and/or the like within a given human-made-cavern 401 so at least the immersive protective medium 407 covers over at least twenty feet (20) of the top of the top most sphere 200 located within that immersive protective medium 407. In some embodiments, immersive protective medium 407 may be a cement slurry which may provide structural support for the spheres 200, the at least one large waste-filled sphere 403, and/or the at least one small waste-filled sphere 405, within that given human-made cavern 401, after the cement slurry has set, hardened, and/or cured. In some embodiments, immersive protective medium 407 may be injected with available oilfield pumping equipment, such as, but not limited to, slurry pumps, coiled tubing, and/or similar injection equipment. In some embodiments, in this situation in which the cement slurry has set, hardened, and/or cured inside the given human-made cavern 401 and around the spheres 200, the at least one large waste-filled sphere 403, and/or the at least one small waste-filled sphere 405; then these spheres 200, the at least one large waste-filled sphere 403, and/or the at least one small waste-filled sphere 405 and their radioactive waste material 201 contents, all of which are residing in the rock formation 503, behaves as a deeply underground storage reservoir system in which the solid $UF_6$ phase exists gravitationally separate, below the $UF_6$ gas phase, with both the solids and the gases, residing inside a volume of rock formation.

Such a radioactive waste disposal system may be analogous in concept, but not in size, to a much larger natural gas/oil reservoir system (e.g., holding billions of cubic feet gas and millions of barrels oil) which develops and exists in deep closed rock formations in which the gas is gravitationally (vertically) above the mostly liquid phase oil and the water and all three phases are confined (limited) under high pressure within impermeable rock formations until an exploratory wellbore is drilled allowing the oil/gas to be produced to the Earth's surface 103. In this invention, it is contemplated that in a single human-made cavern 401 there may be hundreds or thousands of these analogous miniscule storage systems of waste spheres 200 containing 40 to 100 liters, more or less, of radioactive waste material 201, with each individual sphere 200 being embedded in the immersive protective media 407 in that given human-made cavern 401.

Figure 5B:
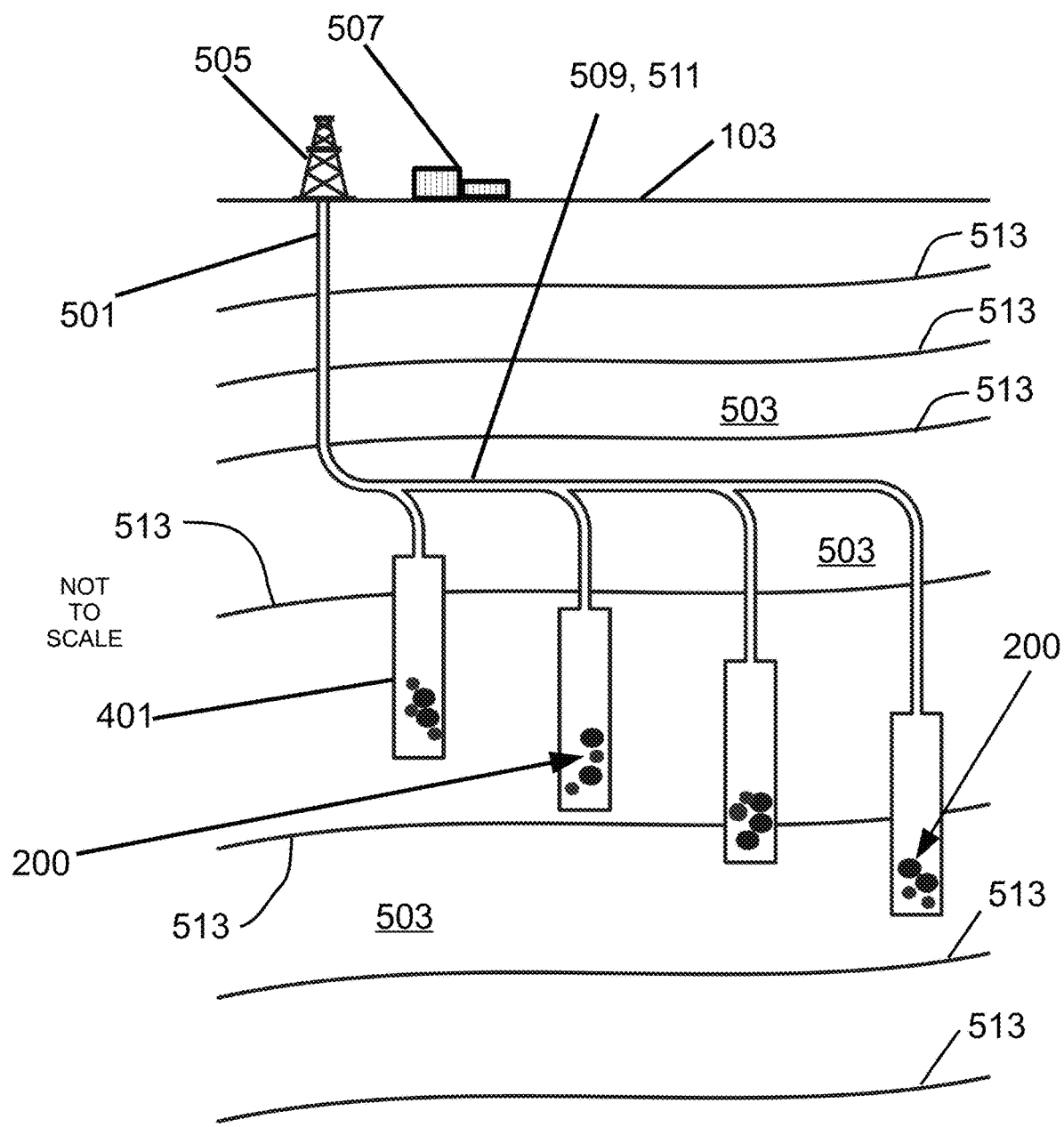
FIG. 5B may depict a schematic cross-section of a system for storing and/or disposing of radioactive waste material within sphere(s), wherein such radioactive waste material containing sphere(s) are disposed within a plurality of human-made caverns, and the plurality of human-made caverns is located within a given deep rock formation.

FIG. 5B may depict a schematic cross-section of a system for storing and/or disposing of radioactive waste material 201 within sphere(s) 200, wherein such radioactive waste material 201 containing sphere(s) 200 are disposed within a plurality of human-made caverns 401, and the plurality of human-made caverns 401 is located within a given formation 503. FIG. 5B may not be to scale. In some embodiments, this radioactive waste disposal system may comprise at least one shared/common substantially vertical wellbore 501 that leads to plurality of human-made caverns 401. Whereas in contrast, the radioactive waste disposal system of FIG. 5A had one substantially vertical wellbore 501 per one human-made cavern 401. In some embodiments, in the radioactive waste disposal system of FIG. 5B, the at least one shared/common substantially vertical wellbore 501, at its distal portion, may diverge into one or more connecting wellbores 509 and/or one or more substantially lateral (horizontal) wellbores 511. In some embodiments, the at least one shared/common substantially vertical wellbore 501 and its one or more connecting wellbores 509 may have a shared internal pathway for conveying tools, spheres 200, large waste-filled sphere 403, and/or small waste-filled sphere 405. In some embodiments, the at least one shared/common substantially vertical wellbore 501 and its one or more substantially lateral (horizontal) wellbores 511 may have a shared internal pathway for conveying tools, spheres 200, large waste-filled sphere 403, and/or small waste-filled sphere 405. In some embodiments, at least some of a length of a given connecting wellbore 509 may be substantially orthogonal with its substantially vertical wellbore 501. In some embodiments, a majority of a length of a given substantially lateral wellbore 511 may be substantially orthogonal with its substantially vertical wellbore 501. In some embodiments, a given connecting wellbore 509 may lead to one or more human-made caverns 401. In some embodiments, a given connecting wellbore 509 may lead to the plurality of human-made caverns 401.

In some embodiments, a plurality of wellbores 501 each leading to at least one human-made cavern 401 may be implemented to provide for an array of human-made caverns 401 under a given selected area of land, thus increasing the disposal volumes in a given areal location on the surface.

Figure 5D:
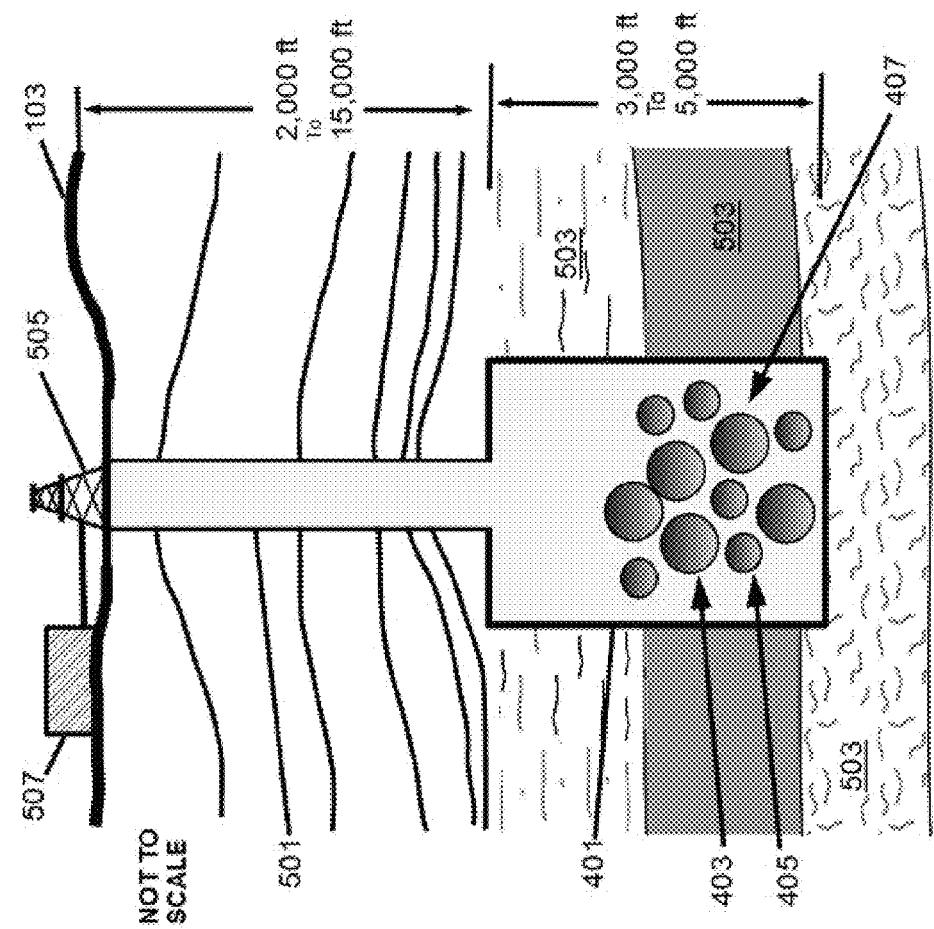
FIG. 5D may show an embodiment where the given human-made cavern is under-reamed in the presence of some drilling fluid.
Figure 5C:
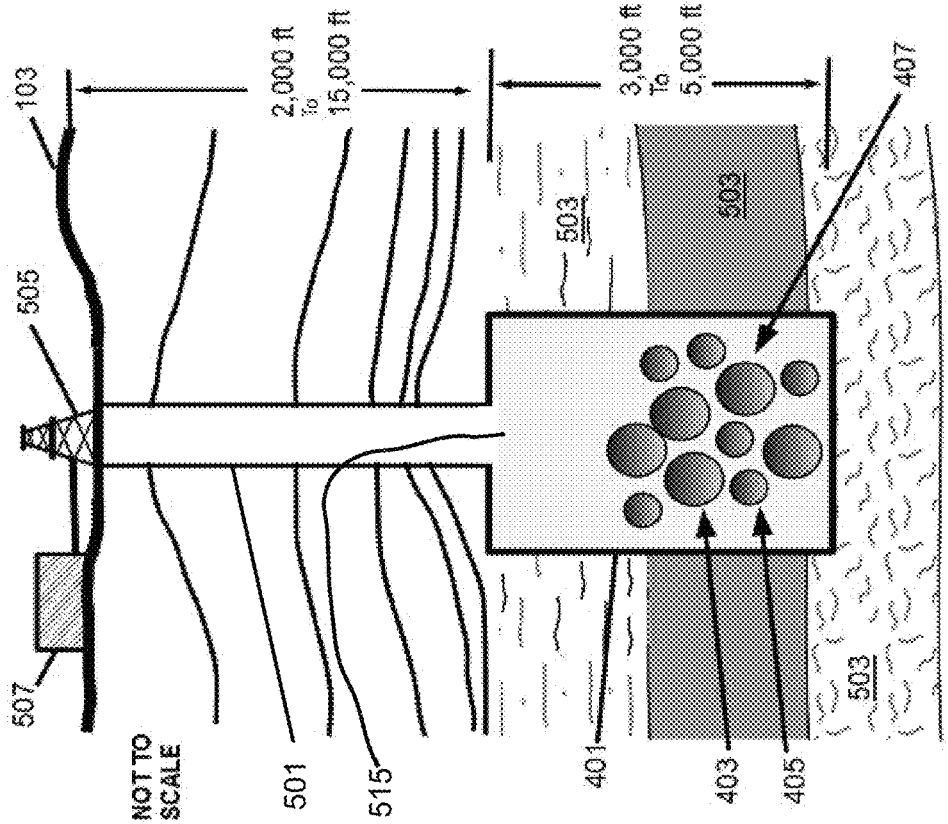
FIG. 5C may illustrate an embodiment which demonstrates a human-made cavern disposal system in which the human-made cavern is initially empty of fluids after formation (other than air).

FIG. 5C may illustrate an embodiment which demonstrates a human-made cavern 401 disposal system in which the human-made cavern 401 is initially empty of fluids after formation (other than air). In this embodiment, the human-made cavern 401 has been air under-reamed and/or if mud under-reamed, the drilling fluids (e.g., drilling mud) has been pumped out or blown out by compressed air. In a situation like this, the initially empty human-made cavern 401 has no measurable hydrostatic or lithostatic pressure in its void (space). In this embodiment, the human-made cavern 401 is essentially a deeply underground/subterranean buried room. For example, this underground type situation with little or no measurable hydrostatic pressure, has been published in the literature and shown in videos of deep mines like those referenced in South Africa (e.g., the Mponeng Gold Mine) which are well below 3.84 kilometers (km) or 13,000 feet deep. There are mine workers who perform in these mines at almost atmospheric conditions. There is no hydrostatic or lithostatic pressure inside such a deep mine. A similar situation may exist in the deep human-made cavern 401 when under-reamed with air and/or foam.

Continuing discussing FIG. 5C, in some embodiments, a plurality of spheres 200 (e.g., at least one large waste-filled sphere 403 and at least one small waste-filled sphere 405) may be disposed in the given human-made cavern 401. In some embodiments, an immersive protective medium 407 may be selected and implemented in the given human-made cavern 401, just covering the plurality of spheres 200. Depending on the density of this immersive protective medium 407, the hydrostatic pressure in this given human-made cavern 401 may vary and may be non-negligible. This hydrostatic pressure will act on the plurality of spheres 200 and could create a collapse in the plurality of spheres 200 if the pressures are too high. The resistance to collapse of the plurality of spheres 200 depends on the diameter of the spheres 200, sphere 200 wall thicknesses, and/or the sphere's structural material(s) of construction (e.g., steel). In general, for the same or equal wall thickness, the smaller the sphere diameter, the greater the resistance to collapse. Design for collapse is a routine assignment and engineering means are available to provide adequate collapse resistance information and data application in the design phase when determining sphere 200 diameter, sphere 200 wall thicknesses, and/or the sphere's structural material(s) of construction (e.g., steel) with respect to a given pressure from the immersive protective medium 407 and with respect to the type and amount of radioactive waste material 201 to be housed within the given sphere 200.

Another means to lower the possibility of sphere 200 collapse, may be to lower the density of the immersive protective medium 407. This type of operation lowers the bottom hole pressure in the given human-made cavern 401, without significantly lowering the compressive resistance of the immersive protective medium 407 material. This may be possible with the utilization of foamed cement slurries for immersive protective medium 407 material. Foam cement slurries with densities as low as 0.48 grams per cubic centimeter (g/cc) have been utilized in industry. The foam cement quality and physical properties may easily be adapted by varying the nitrogen or air used in the foam process. In this patent application a range of foam cement slurry 407 density may be selected from 0.4 g/cc to 1.2 g/cc, including either or both those endpoints and densities in between.

Foamed cement slurries are well known in industry. These slurries are usually generated by mixing a gas phase (such as, but not limited to, nitrogen or air) with a cement slurry and selective surfactants to keep the discrete gas phase bubbles stable until the cement slurry sets. Chemical accelerators or chemical retarders may be added to control the chemistry of reaction and thus decrease or increase slurry setting time. The gas phase modifies the density but has a small effect on the compressive strength of the slurry when set or hardened.

Another quality of the foamed cement is its ductility compared to untreated cement slurry. Foam cement has a ductility at least one order of magnitude more ductile than regular cement (non-foamed cement). This property means that the foam cement may deform under tensile stress without fracturing. This ductility provides for additional benefits in the waste disposal process wherein the spheres 200 may fluctuate, i.e., increase or decrease, in size with temperature and pressure changes in the given human-mace cavern 401. The ductile foam cement as the immersive protective medium 407 remains bonded to the surface of the spheres 200. Foam cement may cost about 15% more than regular cement, however, this is not a major impediment to its use especially in the nuclear waste industry, wherein costs are regularly measured in billions of dollars.

An additional benefit of foam cement in this patent application is its ability to "bond" or adhere to solid surfaces. Foam cement has better bonding properties than conventional cement slurries and because of this property the foam cement fluid may contact the rock formation 503 surfaces better (the internal surfaces of the given human-made cavern 401 may be of rock formation 503; and/or the internal surfaces of a given lateral wellbore 511 may be of rock formation 503). The foam cement will also contact and bond to the spheres 200 external surfaces better than non-foamed cements, thus providing a more permanent physical protection compared to ordinary cement slurries.

A further complimentary attribute of the foamed cement system as the immersive protective medium 407 for disposal of waste spheres 200, is that the gas bubbles present in the foam cement may "plate out" against the human-made cavern 401 walls (or the lateral wellbore 511 walls) of the rock formation 503 during the slurry setting process. This thin layer of gas provides a fluid barrier that may minimize migration or fluid loss from the given human-made cavern 401 to the surrounding rock formation 503. The gas layer which plates out, may allow the gas phase to selectively plug up (block) the interstitial pore spaces in the matrix of the rock formation 503 and this increase in gas saturation lowers the relatively permeability for other fluid phases which may try to migrate through the connected pore spaces away from the disposed waste materials. Such lowered flow characteristics may prevent the waste products 201 from migrating away from the disposal location and thus be an additional beneficial effect of this novel process of nuclear waste disposal.

FIG. 5D may show an embodiment where the given human-made cavern 401 is under-reamed in the presence of some drilling fluid. In some embodiments, the drilling fluid may be: drilling mud, cement slurry, heavy oil, some other type of protective fluid (such as, but not limited to, immersive protective medium 407), portions thereof, combinations thereof, and/or the like. The pressure at the bottom of the given human-made cavern 401 is based on the hydrostatic head of potentially thousands of feet of liquid above and may generate a pressure head of more than 0.5 pounds per square inch per foot (psi/ft). For example, and without limiting the scope of the present invention, in a 10,000 foot wellbore 501 plus human-made cavern 401 system, the bottom hole pressure may thus be in excess of 5,000 psi. In such systems the human-made cavern 401 and wellbore 501 are full or partially full of fluid there may be a need to maintain pressures below the collapse point of the spheres 200 (e.g., at least one large waste-filled sphere 403 and at least one small waste-filled sphere 405) inside that given human-made cavern 401.

For example, and without limiting the scope of the present invention, a cement slurry which has a specific gravity of 1.80 g/cc (15 pounds per gallon), may generate an almost 1.80 psi/foot pressure gradient. A 10,000 foot wellbore 501 plus human-made cavern 401 system may have a very high bottom hole pressure of 18,000 psi. It is imperative that the selected wellbore 501 height (vertical length), the selected human-made cavern 401 vertical height, the selected protective medium 407 and the sizes (diameters) of the waste disposal spheres 200 are optimized such that the end results provide for a wellbore-cavern sphere design combination that does not violate any operational parameters, principally hydrostatic pressure on the spheres 200. Lack of proper design may cause collapse of the spheres 200 and migration of the waste material 201 away from the given human-made cavern 401. In general, the situation shown in FIG. 5D may require shorter vertical wellbores 501, and shorter human-made cavern 401 vertical heights; i.e., systems may be implemented closer to the Earth's surface 103 as compared to the disposal system of FIG. 5C.

Figure 6A:
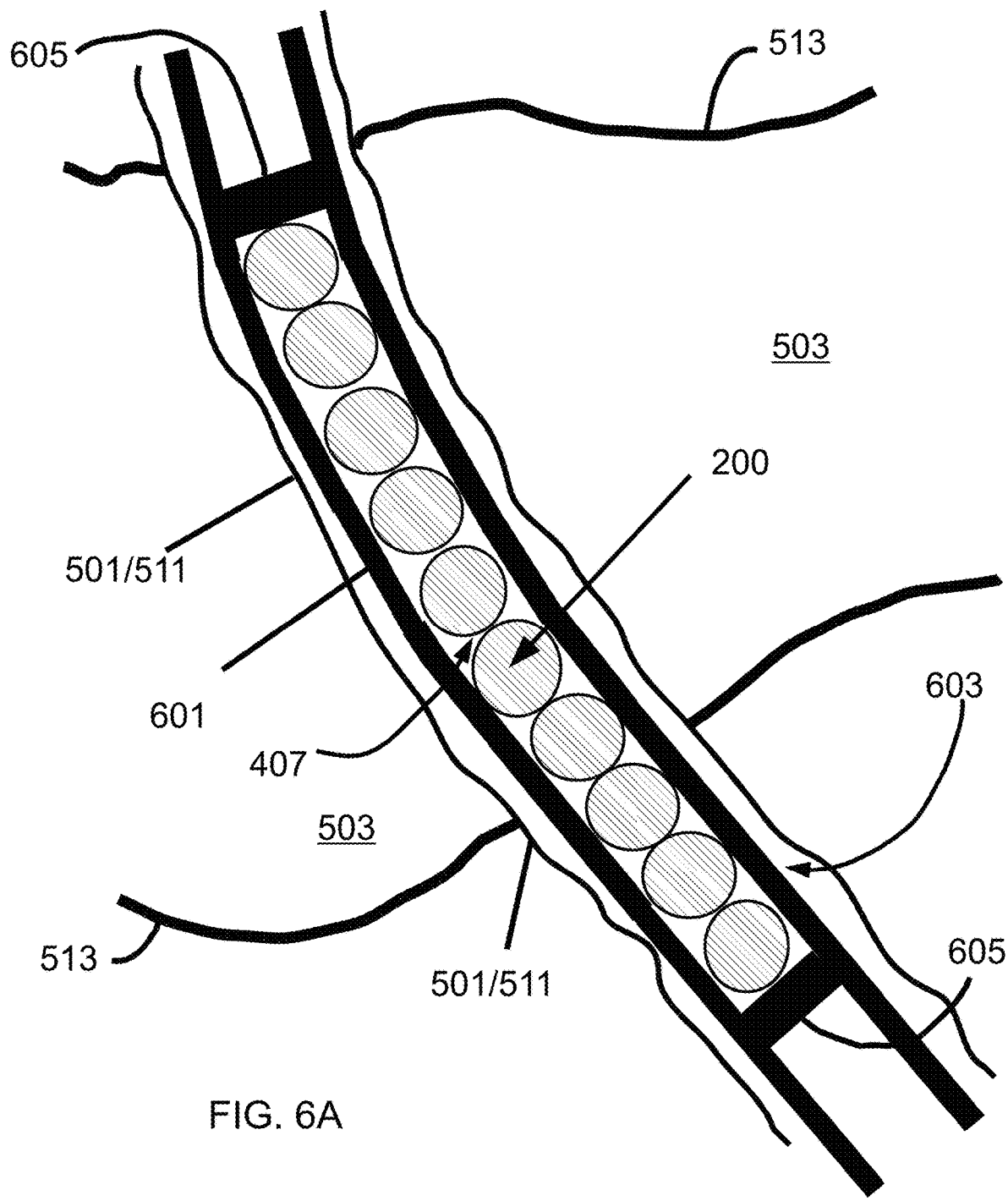
FIG. 6A may depict a schematic cross-section through a length of a portion/section of a given wellbore with a plurality of spheres disposed therein.

FIG. 6A may depict a schematic cross-section through a length of a portion/section of a given wellbore with a plurality of spheres 200 disposed therein. In some embodiments, that given wellbore may be a portion of the substantially vertical wellbore 501; or in some embodiments, that given wellbore may be a portion of the substantially lateral wellbore 511. In some embodiments, the substantially lateral wellbore 511 may be located within formation 503. When that given wellbore may be a portion of 501, then plurality of spheres 200 shown in FIG. 6A may be in transition to the substantially lateral wellbore 511. In some embodiments, with respect to a relationship between the substantially vertical wellbore 501 and the substantially lateral wellbore 511, a majority of a length of the substantially lateral wellbore 511 may be substantially orthogonal with its substantially vertical wellbore 501. In some embodiments, at least some of the spheres 200 selected from the plurality of spheres 200 may comprise radioactive waste material 201. In some embodiments, the plurality of spheres 200 may be arranged in a line or string within the given wellbore. In some embodiments, that line or string of the plurality of spheres 200 in the given wellbore may be substantially linear or curved depending upon if that particular section of the given wellbore is curved or running substantially linearly. In some embodiments, the plurality of spheres 200 within the given wellbore may comprise spheres 200 of a same diameter. In the embodiments where the diameters of the plurality of spheres 200 within the given wellbore are the same, there may little to no benefit in different diameter sizes for the spheres 200 in the given wellbore. In some embodiments, the sphere 200 diameter may be determined such that the sphere 200 diameter is smaller than the internal diameter of the given wellbore; as such sizing may allow for easy passage of the spheres 200 without any restrictions, blockage, or obstruction during the emplacement process via the substantially vertical wellbore 501 and/or the substantially lateral wellbore 511. In some embodiments, the sphere 200 external diameter may be at least one (1) inch smaller than the internal diameter of the given wellbore. Furthermore, in some instances mixing different diameter sizes of spheres 200 in the given wellbore may be counterproductive because there is a possibility of physical obstruction in the given wellbore while loading the spheres 200 of different diameters and creating a blockage in that given wellbore; which in turn may then lead to a costly and time-consuming fishing operation to clear out the blockage. In some embodiments, disposed within the given section of the wellbore, with the plurality of spheres 200, may be immersive protective medium 407. In some embodiments, immersive protective medium 407 may surround the plurality of spheres 200 within the given wellbore. FIG. 6A may not be shown to scale.

In some embodiments, the plurality of spheres 200 within the given wellbore may comprise spheres 200 of at least two different diameters. In some embodiments, the plurality of spheres 200 within the given wellbore may comprise at least one large waste-filled sphere 403 and/or at least one small waste-filled sphere 405.

Continuing discussing FIG. 6A, in some embodiments, the given section of wellbore may be lined with casing 601. In some embodiments, casing 601 may be steel pipe, steel piping, and/or the like. In some embodiments, casing 601 may be placed within the given wellbore using drill rig 505. In some embodiments, at least some of the substantially vertical wellbore 501 and/or the substantially lateral wellbore 511 may be lined with casing 601. In some embodiments, between casing 601 and the rock walls of the given wellbore may be placed one or more cements 603. In some embodiments, the one or more cements 603 may be pumped into the annular space between casing 601 and the rock walls of the given wellbore via drill rig 505 and/or a pumping means/station. In some embodiments, lining the given wellbore with casing 601 may be done before emplacing the spheres 200 into that given wellbore, as casing 601 may provide a smoother surface offering less friction and resistance than the rock walls of the given wellbore.

Continuing discussing FIG. 6A, in some embodiments, before a given plurality of spheres 200 is loaded into the given wellbore, a plug 605 may be inserted into the given wellbore. In some embodiments, after a given plurality of spheres 200 is loaded into the given wellbore, a plug 605 may be inserted into the given wellbore. In some embodiments, a given plurality of spheres 200 may have be bound by two plugs 605, a leading plug 605 and a trailing plug 605, respectively. In some embodiments, the plug(s) 605 may be inserted into casing 601, within the given section of wellbore. In some embodiments, one or more plug(s) 605 may separate and/or seal different pluralities of spheres 200 from each other. In some embodiments, the plug(s) 605 may seal off the given section of wellbore. In some embodiments, the plug(s) 605 may seal off the given section of casing 601 within the given section of wellbore. In some embodiments, plug(s) 605 may be preexisting wellbore/casing packer like devices which are readily available in the oil well industries.

Figure 6B:
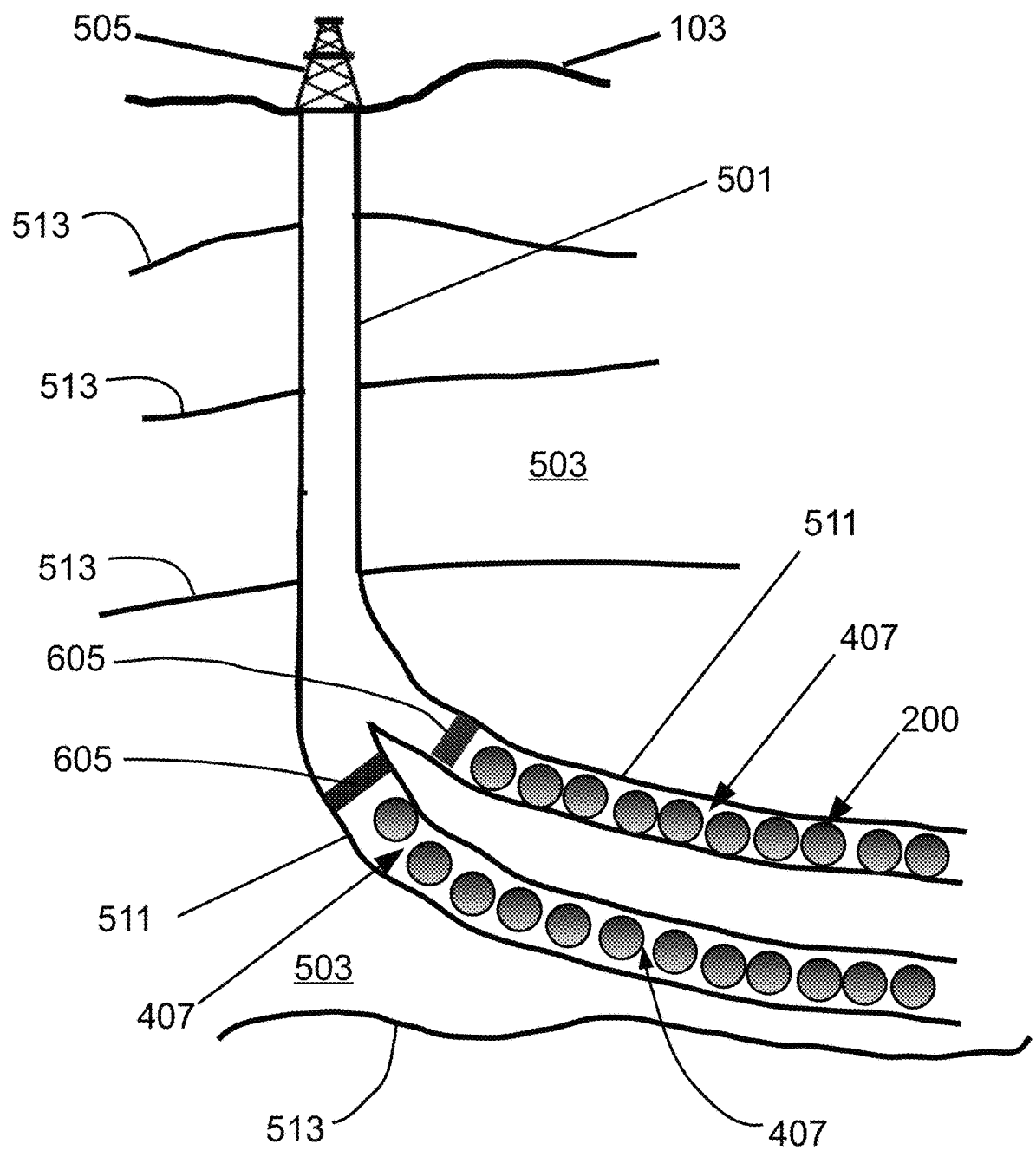
FIG. 6B may depict a schematic cross-section of a system for storing and/or disposing of radioactive waste material within sphere(s), wherein such radioactive waste material containing sphere(s) are disposed within at least one substantially lateral wellbore, and the at least one substantially lateral wellbore is located within a given deep rock formation.

FIG. 6B may depict a schematic cross-section of a system for storing and/or disposing of radioactive waste material 201 within sphere(s) 200, wherein such radioactive waste material 201 containing sphere(s) 200 are disposed within at least one substantially lateral wellbore 511, and the at least one substantially lateral wellbore 511 is located within a given formation 503. FIG. 6B may not be to scale. In some embodiments, there may be at least one common/shared substantially vertical wellbore 501 that connects to the at least one substantially lateral wellbore 511. In some embodiments, the at least one substantially lateral wellbores 511 may be at different depths or a same depth below the Earth's surface 103. If at a same depth, then the substantially lateral wellbores 511 may radiate out from the shared/common substantially vertical 501 in different directions into formation 503. In some embodiments, each of the at least one substantially lateral wellbore 511 may comprise one or more pluralities of spheres 200. In some embodiments, each plurality of spheres 200 within a given substantially lateral wellbore 511 may be bound by plug(s) 605. In some embodiments, at least some of the spheres 200 selected from a given plurality of spheres 200 within a given substantially lateral wellbore 511, may comprise radioactive waste material 201. In some embodiments, at least some of the substantially vertical wellbore 501 and/or the substantially lateral wellbore 511 may be lined with casing 601. In some embodiments, immersive protective medium 407 may be loaded into the substantially lateral wellbore 511 so that the immersive protective medium 407 surrounds the plurality of spheres 200 within that substantially lateral wellbore 511.

In some embodiments, it is contemplated that multiple substantially lateral wellbores 511 may be drilled from a single substantially vertical wellbore 501. Today (2020) in some published cases more than ten (10) lateral wellbores somewhat similar to wellbore 511 have been successfully drilled from a single drilling rig location from the Earth's surface 103.

In some embodiments, wellbore(s) 501, 509, and/or 511 and/or human-made cavern(s) 401 may be air-drilled, air-under-reamed, mud-drilled, mud-under-reamed, portions thereof, combinations thereof, and/or the like. In some embodiments, when a drilling/under-reaming mud was used, compressed air may be used to dry out the given wellbore(s) 501, 509, and/or 511 and/or the given human-made cavern(s) 401.

In some embodiments, immersive protective medium 407 may be filled within a given wellbore (501, 509, and/or 511) to at least forty (40) feet above a plug 605.

Figure 7:
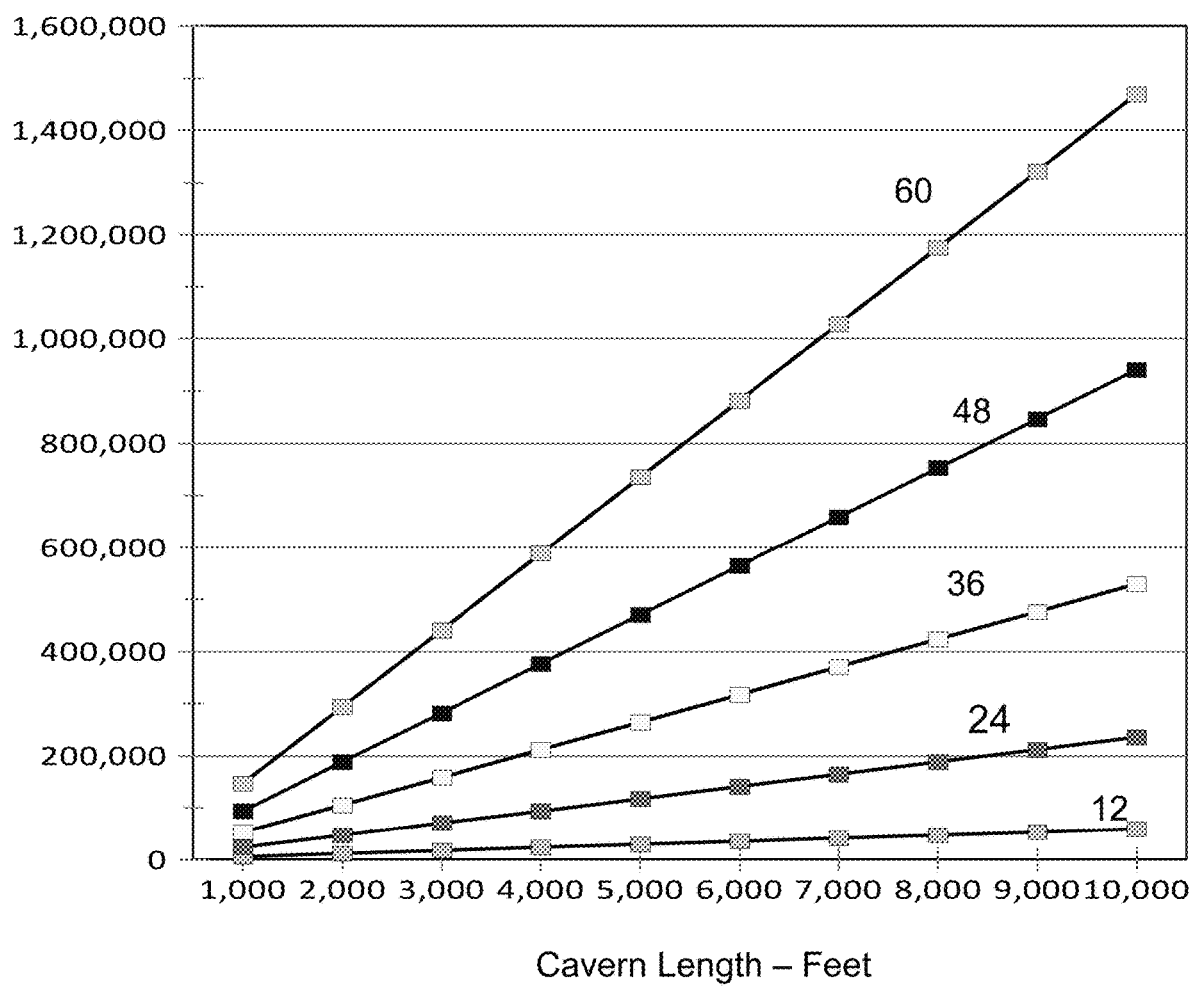
FIG. 7 may show a graph of volumetric capacity in gallons for human-made caverns of different lengths (heights) from 1,000 feet to 10,000 feet and diameters from twelve (12) inches to sixty (60) inches.

FIG. 7 may show a graph of volumetric capacity in gallons for human-made caverns 401 different lengths (heights) from 1,000 feet to 10,000 feet and diameters from twelve (12) inches to sixty (60) inches. As shown in FIG. 7, the total volumetric capacity for a single human-made cavern 401 capacity may exceed 1,500,000 gallons. Such human-made caverns 401 may accommodate a significant quantity of spheres 200 (and thus much radioactive waste material 201).

Figure 8A:
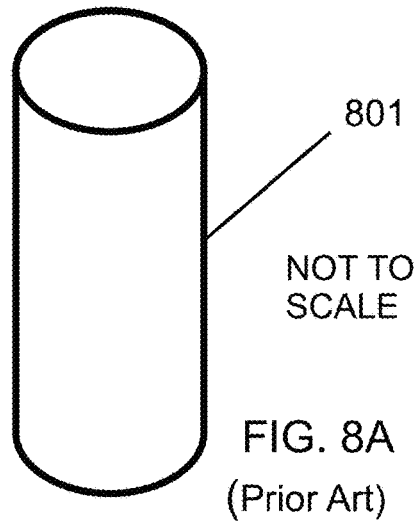
FIG. 8A depicts a perspective view of a prior art nuclear waste cylinder capsule.
Figure 8B:
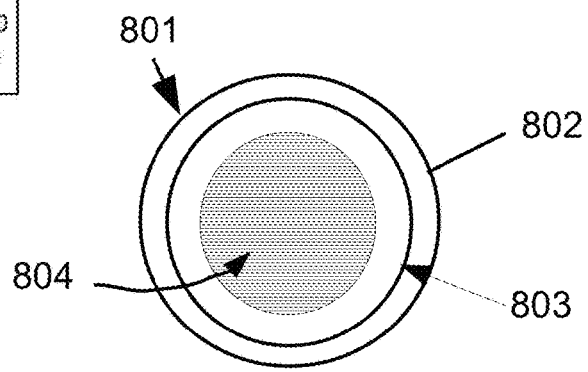
FIG. 8B shows a diameter cross-section through a given prior art nuclear waste cylinder capsule.
Figure 8C:
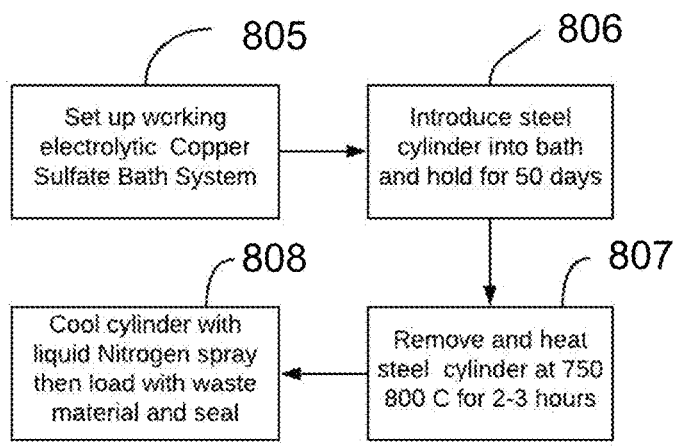
FIG. 8C shows steps in forming a given prior art nuclear waste cylinder capsule with its internal nuclear waste.

FIG. 8A, FIG. 8B, and FIG. 8C illustrate prior art technologies in which a slow months-long electrolytic process is utilized to construct a single waste cylinder 801. FIG. 8A depicts a perspective view of a prior art waste cylinder 801. Waste cylinder 801 may be new/clean surface waste storage container 100 and/or rusted surface waste storage container 100a. FIG. 8B shows a diameter cross-section through a given waste cylinder 801. Waste cylinder 801 has an outer/exterior steel wall 802. Waste cylinder 801 has a thin inner/interior copper lining applied electrolytically. Waste cylinder 801 has nuclear waste 804 disposed in its interior. FIG. 8C shows steps 805, 806, 807, and 808 in forming a given waste cylinder 801 with its internal nuclear waste 804. In step 805 the copper sulfate electrolytic bath is setup. In step 806 the steel cylinder is immersed in the electrolytic bath for a period of fifty (50) days. In step 807 the steel cylinder is removed from the electrolytic bath and heated to 750 degrees Celsius to 800 degrees Celsius for two to three hours. In step 808 the steel cylinder is cooled quickly with liquid nitrogen and then loaded with the nuclear waste 804.

Figure 9:
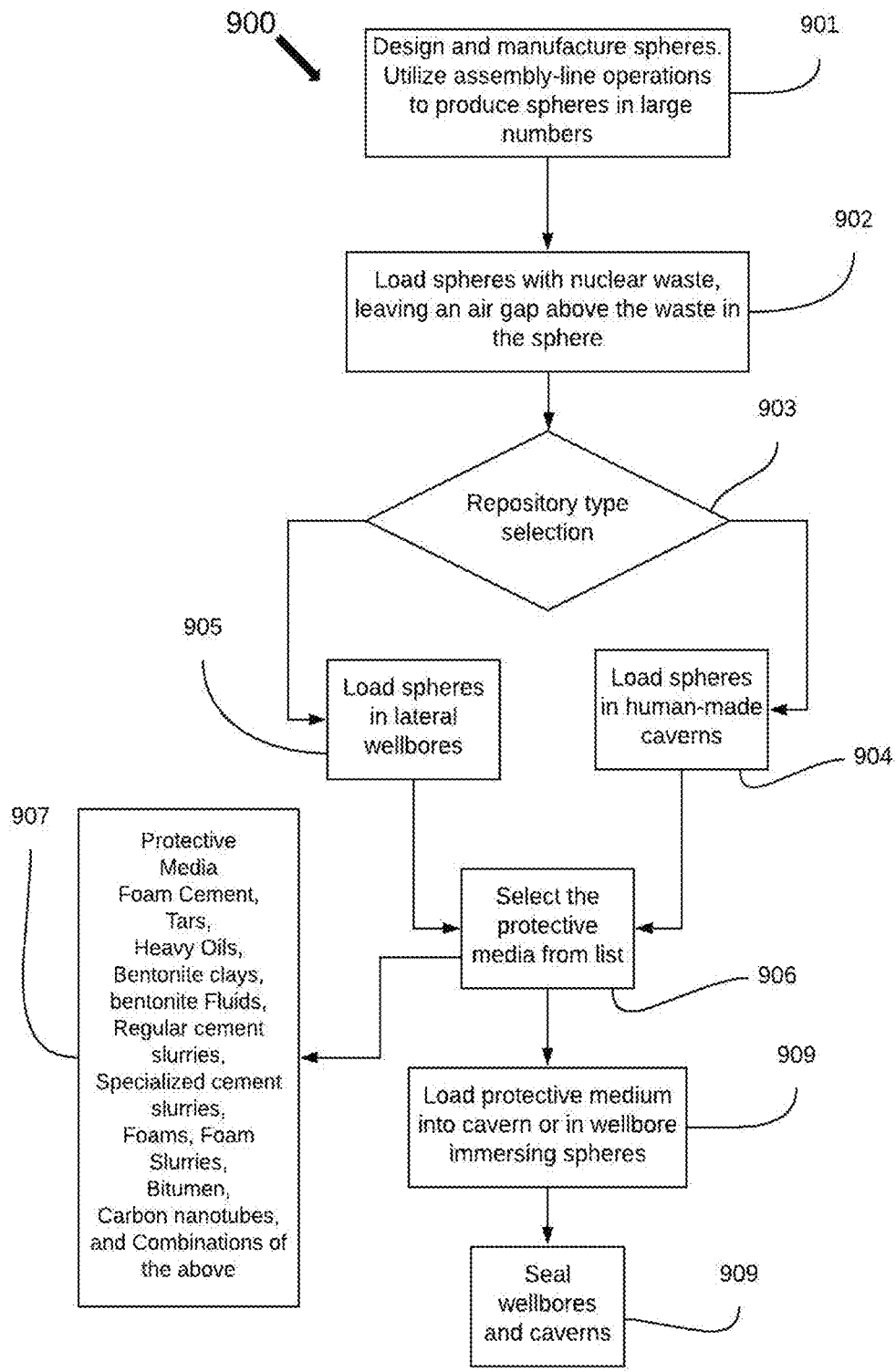
FIG. 9 may illustrate a flow chart showing a method and at least some of the steps of the method for disposing of nuclear waste using spheres, immersive protective medium, wellbores and/or human-made caverns, and deeply located rock formations.

FIG. 9 may illustrate a flow chart showing a method and at least some of the steps of the method for disposing of nuclear waste. In some embodiments, method 900 may be a method of disposing of uranium using spheres. In some embodiments, method 900 may be a method of disposing of uranium using spheres that are emplaced within a formation 503. In some embodiments, method 900 may be a method of disposing of uranium using spheres that are emplaced within human-made cavern(s) 401 and/or within substantially lateral wellbore(s) 511, wherein the human-made cavern(s) 401 and/or the substantially lateral wellbore(s) 511 are located within a formation 503. In some embodiments, method 900 may comprise at least one step selected from steps of: 901, 902, 903, 904, 905, 906, 907, 908, 909, portions thereof, combinations thereof, and/or the like. Some embodiments of method 900 may omit one or more of these steps. Some embodiments of method 900 may be one or more decision steps (e.g., steps 903). Some embodiments of method 900 may repeat at least one of these steps (e.g., because more than one human-made cavern 401 may be formed according to method 900). In some embodiments, the order of the steps in method 900 may not occur in numerical order of the step's reference numeral.

In some embodiments, method 900 may be a method for disposal of uranium waste products 201. In some embodiments, method 900 may comprise steps of: 901, 902, 904 and/or 905, 908, and 909. In some embodiments, step 901 may be a step of manufacturing a plurality of spherical capsules 200, wherein the plurality of spherical capsules 200 are configured to contain (predetermined) amounts (quantities) of the uranium waste products 201. In some embodiments, step 902 may be a step of filling at least a subset of the plurality of spherical capsules 200 with the uranium waste products 201 such that each spherical capsule 200 selected from the at least the subset of the plurality of spherical capsules 200 is filled to a predetermined capacity (e.g., 90% capacity). In some embodiments, step 904 and/or step 905 may be a step of emplacing the at least one subset of the plurality of spherical capsules 200 that contain the uranium waste products 201 into at least one repository yielding emplaced spherical capsules. In some embodiments, the at least one repository may be: at least one human-made cavern 401, at least one substantially lateral wellbore 511, or the at least one human-made cavern 401 and the at least one substantially lateral wellbore 511. In some embodiments, before the step 909, the at least one repository may be a fluid pathway linked to the Earth's surface 103 via at least one substantially vertical wellbore 501. In some embodiments, the at least one human-made cavern 401 may be constructed by substantially vertical under-reaming operations into the deep geologic rock formation 503. In some embodiments, the at least one substantially lateral wellbore 511 may be constructed from substantially lateral drilling operations into the deep geologic rock formation 503. In some embodiments, the at least one repository may be located withing deep geologic rock formation 503. In some embodiments, deep geologic rock formation 503 may begin at a minimum depth from the Earth's surface 103, wherein the minimum depth may be selected from a range of 2,000 feet to 15,000 feet, plus or minus 1,000 feet. In some embodiments, step 908 may be a step of injecting immersive protective medium 407 around the emplaced spherical capsules 200 that are within the at least one repository. In some embodiments, the step 909 may be a step of sealing the at least one repository. See e.g., FIG. 9.

Continuing discussing FIG. 9, in some embodiments, step 901 may be a step of designing the disposal spheres 200 for use in the deep wellbores 501 and/or 511 and/or for use in human-made caverns 401. In some embodiments, step 901 may be a step of manufacturing the disposal spheres 200 for use in the deep wellbores 501 and/or 511 and/or for use in human-made caverns 401. In some embodiments, step 901 may be a step of designing and/or manufacturing the disposal spheres 200 for use in the deep wellbores 501 and/or 511 and/or for use in human-made caverns 401. In some embodiments, the computed design parameters for spheres 200 may provide the pre-selected sizes, i.e., diameters and volumes (capacities) and mechanical and structural properties for the spheres 200. In some embodiments, this designing step 901 may comprise predetermining: materials of construction for the plurality of spherical capsules 200, diameters for the plurality of spherical capsules 200, wall thickness for a plurality of spherical capsules 200, valve 305 type for the plurality of spherical capsules 200, valve 305 location for the plurality of spherical capsules 200, and manufacturing method to be used to construct to the plurality of spherical capsules; such that the plurality of spherical capsules 200 may be configured to withstand a predetermined external hydrostatic pressure from the immersive protective medium 407 without collapsing and such that the plurality of spherical capsules 200 may have an internal volume that does not exceed a minimum predetermined volume nor a maximum predetermined volume. In some embodiments, the determined materials of construction, wall thickness, coatings, diameter, and/or the like for a given sphere 200 to be manufactured may be done to accommodate planned hydrostatic pressures from immersive protective medium 407. In some embodiments, these sphere design parameters may then be transferred and used to manufacture the disposal spheres 200. In some embodiments, the manufacturing process utilized and illustrated in step 901 may include/comprise automated assembly-line operations to manufacture waste disposal spheres 200 by the hundreds or the thousands for use in nuclear waste disposal processes. In some embodiments, in step 901 the assembly-line manufacturing usually begins with the sphere 200 construction from plate steel stock which is hydraulically formed to enable hemispherical sub-units. In some embodiments, the steel stock material may be laminated with one or more protective layers, or it may be treated with protective ceramic coatings internal to the sphere/hemisphere 200. In some embodiments, hemispheres may be welded together forming spheres 200. In some embodiments, the completed spheres 200 may comprise structural outer shell 301 and protective inner layer/shell 303. In some embodiments, the completed spheres 200 may comprise at least one valve 305. See e.g., FIG. 3A-FIG. 3D and their discussions above. The completed spheres 200 are shipped to multiple surface storage locations for further waste processing (e.g., for receiving radioactive waste material 201). In some embodiments, step 901 may progress to step 902.

In some embodiments, when the at least one repository may be the at least one human-made cavern 401, the step 901 may further comprise manufacturing of the plurality of spherical capsules 200 in at least two different external diameters, smaller spheres 405 and larger spheres 403, respectively.

Continuing discussing FIG. 9, in some embodiments, step 902 may be a step of loading and/or filling an empty sphere 200, through its valve 305, with a selection of radioactive waste material 201. As noted in the FIG. 2 discussion, radioactive waste material 201 may exist in many forms/types. In some embodiments, valve 305 may be constructed to specifically accommodate different types/forms of radioactive waste material 201. In liquid form the radioactive waste material 201 may be injected into the given sphere 200 (using valve/port 305). In crystalline form the radioactive waste material 201 may be inserted into the given sphere 200 via valve 305. In powder form the radioactive waste material 201 may be loaded into the given sphere 200 via valve 305. The inserted waste material 201 into the given sphere 200 may deliberately be limited in volume/quantity such that the given sphere 200 is less than 90 percent capacity full. Such a not completely full loading process may leave an air gap 309 above the loaded radioactive waste material 201 within the given sphere 200. In some embodiments, after the loading of the radioactive waste material 201 into the given sphere 200, its valve(s) 305 may be sealed, closed, and/or plugged. In some embodiments, step 902 may progress to step 903.

In some embodiments, after the step 902 and before the step 904 and/or step 905, method 900 may further comprise a step sealing the at least the subset of the plurality of spherical capsules 200 that contain the uranium waste products 201 to prevent leakage of the uranium waste products 201. In some embodiments, this may be accomplished by closing and/or sealing applicable valves 305.

Continuing discussing FIG. 9, in some embodiments, step 903 may be a decision step of determining whether to load the spheres 200 into substantially lateral wellbore(s) 511 and/or into human-made cavern(s) 401. In some embodiments, step 903 may be a decision step of selecting to load the spheres 200 into substantially lateral wellbore(s) 511 and/or into human-made cavern(s) 401. In some embodiments, the decision may be made based on economics and/or rock formations 503 properties (e.g., formation 503 shape, size, depth, porosity, and/or the like) in the selected disposal areas or other operational parameters such as quantity of spheres 200 to be disposed of and/or available wellbore depths/lengths. In some embodiments, both substantially lateral wellbore(s) 511 and human-made cavern(s) 401 may be utilized. In some embodiments, when there may be sufficient lateral space, then substantially lateral wellbore(s) 511 may be used. In some embodiments, when lateral space may be insufficient, then human-made cavern(s) 401 may be used. In some embodiments, when spheres 200 may have a same diameter, then substantially lateral wellbore(s) 511 may be used. In some embodiments, when different sized spheres 200 may be used, then human-made cavern(s) 401 may be used. In some embodiments, when formation 503 depths may be sufficient, then human-made cavern(s) 401 may be used. In some embodiments, when formation 503 depths may be insufficient, then substantially lateral wellbore(s) 511 may be used. In some embodiments, step 903 may progress to step 905 or to step 904.

Continuing discussing FIG. 9, in some embodiments, step 904 may be a step of loading, emplacing, and/or landing the waste containing spheres 200 into at least one reamed-out human-made cavern 401. In some embodiments, prior to executing step 904 the at least one human-made cavern 401 needs to be formed within the given formation 503; which also requires forming at least one common/shared substantially vertical wellbore 501 that connects/leads to the at least one human-made cavern 401. In some embodiments, prior to the step 904, the method 900 may further comprise a step of constructing the at least one repository (e.g., at least one human-made-cavern 401) by drilling at least one pilot wellbore 501 from the Earth's surface 103 to the deep geologic rock formation 503 using at least one drill rig 505 and then forming the at least one repository in the deep geologic rock formation 503. In some embodiments, this forming may be done by further drilling and/or by under-reaming. In some embodiments, drill rig 505 may be used to facilitate step 904 from the Earth's surface 103. In some embodiments, in this step 904 the spheres 200 of varied sizes (diameters) are selected such that a maximum volume of radioactive waste material 201 may be implemented into the volume of the given human-made cavern 401. In some embodiments, computing an optimal mix of sphere 200 sizes, such that the maximum number of disposal spheres 200 are landed into the given human-made cavern 401, a selected immersive protective medium 407 may effectively protect the radioactive waste material 201 by fully immersing the spheres 200 in the immersive protective medium 407. In some embodiments, step 904 may progress to step 906.

In some embodiments, the plurality of spherical capsules 200 utilized in method 900 may be of at least two different external diameters. In some embodiments, the plurality of spherical capsules 200 designed and/or manufactured in step 901 may be of at least two different external diameters. In some embodiments, the plurality of spherical capsules 200 filled with radioactive waste material 201 in step 902 may be of at least two different external diameters. In some embodiments, the plurality of spherical capsules 200 (with radioactive waste material 201) that may be emplaced into human-made-cavern(s) 401 in step 904 may be of at least two different external diameters.

In some embodiments, the at least the subset of the plurality of spherical capsules 200 that contain the uranium waste products 201 may be of at least some of the smaller spheres 405 and of at least some of the larger spheres 403. In some embodiments, step 904 may comprise emplacing of the at least the subset of the plurality of spherical capsules 200 that contain the uranium waste products 201 into at least one repository by mixing quantities of the at least some of the smaller spheres 405 and the at least some of the larger spheres 403, such that a total quantity of the uranium waste products 201 received into the at least human-made cavern 401 may be maximized.

Continuing discussing FIG. 9, in some embodiments, step 906 may be a step of selecting an immersive protective medium 407 for surrounding the disposed of spheres 200. In some embodiments, step 906 may communicate with list 907. In some embodiments, several materials may be available for the selection of the immersive protective medium 407 as shown in list 907 and/or in the above previous discussion of immersive protective medium 407. In some embodiments, the selection of immersive protective medium 407 may be made based on: effectiveness of protection conferred by the given immersive protective medium 407; ease of operation; desired density of immersive protective medium 407; minimizing hydrostatic pressure of immersive protective medium 407; and/or costs. In some embodiments, a foaming cement/slurry may be selected for immersive protective medium 407. In some embodiments, a foam cement slurry, for the immersive protective medium 407, may reduce a density and the predetermined external hydrostatic pressure of the immersive protective medium 407 as compared to using a non-foam cement slurry for the immersive protective medium 407. In some embodiments, step 906 may progress to step 908.

Continuing discussing FIG. 9, in some embodiments, step 908 may be a step of loading, inserting, injecting, pumping, and/or the like the immersive protective medium 407 so that the immersive protective medium 407 surrounds the emplaced spheres 200, wherein the emplaced spheres 200 may be located within wellbore(s) 511 and/or within the human-made cavern(s) 401. In some embodiments, drill rig 505, pump(s), pumping means, pumping station(s), injection unit(s), tubing, and/or coiled tubing may be used to facilitate step 908 from the Earth's surface 103. In some embodiments, this step 908 process may be a straightforward operation, wherein similar such pumping/injection operations are carried out in the oilfield usually with available pumping equipment and coiled tubing units or injection units. In some embodiments, step 908 may progress to step 909.

Continuing discussing FIG. 9, in some embodiments, step 909 may be a step of closing and/or sealing off the applicable human-made cavern(s) 401, the applicable substantially lateral wellbore(s) 511, the applicable substantially vertical wellbore(s) 501, combinations thereof of, and/or the like. In some embodiments, concrete plugs, cement plugs, downhole packets, portions thereof, combinations thereof, and/or the like may be used for executing step 909.

Continuing discussing FIG. 9, in some embodiments, step 905 may be a step of loading, emplacing, and/or landing the waste containing spheres 200 into one or more substantially lateral wellbores 511. In some embodiments, prior to executing step 905 the one or more substantially lateral wellbores 511 need to be formed within the given formation 503; which also requires forming at least one common/shared substantially vertical wellbore 501 that connects/leads to the one or more substantially lateral wellbores 511. In some embodiments, prior to the step 904, the method 900 may further comprise a step of constructing the at least one repository (e.g., at least one substantially lateral wellbore 511) by drilling at least one pilot wellbore 501 from the Earth's surface 103 to the deep geologic rock formation 503 using at least one drill rig 505 and then forming the at least one repository in the deep geologic rock formation 503. In some embodiments, this forming may be done by further drilling. In some embodiments, prior to executing step 905, at least some portions of the wellbore(s) (501 and/or 511) may be lined with casing 601. In some embodiments, prior to executing step 905, cement 603 may be injected into the annular regions between casings 601 and the rock walls of the wellbores. In some embodiments, drill rig 505 may be used to facilitate step 905 from the Earth's surface 103. In some embodiments, before inserting a given plurality of spheres 200 into the given wellbore section, at least one plug 605 may be inserted into the given wellbore (or casing 601). In some embodiments, plug(s) 605 may be located on either side or both sides of a given subset of spheres 200 in wellbore(s) (501 and/or 511). In some embodiments, in this step 905 the spheres 200 of identical/same size may be landed into a given substantially lateral wellbore 511 (casing 601) as shown in FIG. 6A and/or in FIG. 6B. In some embodiments, plugs 605 may be used to separate selected quantities of spheres 200 in the given wellbore 511. In some embodiments, immersive protective medium 407 may be injected into the wellbore 511 after the spheres 200 are landed (see e.g., step 908). In some embodiments, in step 905 the waste spheres 200 may be landed into multiple substantially lateral wellbores 511 as shown in FIG. 6B which illustrates a multi-lateral system of wellbores 511. In some embodiments, step 905 may progress to step 906.

In some embodiments, when the at least one repository may be the at least one substantially lateral wellbore 511, the emplaced spherical capsules 200 of the step 905 may be of a same external diameter.

Note, welds and welding noted herein may be with respect to metal welds and/or metal welding.

Devices, apparatus, mechanisms, systems, means, processes, and methods for the long-term disposal and/or storage of uranium waste materials (such as, but not limited to, uranium hexafluoride) within deeply located lateral wellbores and/or within deeply located human-made caverns, wherein the lateral wellbores and/or the human-made caverns are located within deep geological rock formations, have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method for disposal of uranium waste products, the method comprising steps of:
    (a) manufacturing a plurality of spherical capsules, wherein the plurality of spherical capsules are configured to contain amounts of the uranium waste products;
    (b) filling at least a subset of the plurality of spherical capsules with the uranium waste products such that each spherical capsule selected from the at least the subset of the plurality of spherical capsules is filled to a predetermined capacity;
    (c) emplacing the at least the subset of the plurality of spherical capsules that contain the uranium waste products into at least one repository yielding emplaced spherical capsules; wherein the at least one repository is located withing a deep geologic rock formation; wherein the deep geologic rock formation begins at a minimum depth from the Earth's surface; wherein the minimum depth is selected from a range of 2,000 feet to 15,000 feet, plus or minus 1,000 feet;
    (d) injecting an immersive protective medium around the emplaced spherical capsules that are within the at least one repository; wherein the immersive protective medium is a foam cement slurry; wherein the foam cement slurry reduces a density and the predetermined external hydrostatic pressure of the immersive protective medium as compared to using a non-foam cement slurry for the immersive protective medium; and
    (e) sealing the at least one repository.

2. The method according to claim 1 wherein the uranium waste products contain uranium are in a form selected from one or more of: uranium hexafluoride; uranium oxide; spent nuclear fuel assembly pellets; depleted uranium metals; mixed waste products; concentrated low-level waste products; solid waste; pellet waste; granules waste; fine solids waste; powder waste; particulate waste; ceramic waste; glass waste; liquid waste; gel waste; portions thereof; or combinations thereof.

3. The method according to claim 1, wherein each spherical capsule selected from the plurality of spherical capsules is comprised of a structural outer shell, a protective inner shell, and at least one valve; wherein the structural outer shell is at least partially made from a steel; wherein the protective inner layer is at least partially made from copper or a copper alloy; and wherein the at least one valve is utilized in the step (b), wherein the at least one valve provides a pathway from an exterior of the spherical capsule to an interior of the spherical capsule.

4. The method according to claim 1, wherein the plurality of spherical capsules are of at least two different external diameters.

5. The method according to claim 1, wherein after the step (b) and before the step (c), the method further comprises a step sealing the at least the subset of the plurality of spherical capsules that contain the uranium waste products to prevent leakage of the uranium waste products.

6. The method according to claim 1, wherein the predetermined capacity is less than 100 percent capacity; wherein the predetermined capacity generates a predetermined free volume within the spherical capsule that is configured for holding gas; wherein the predetermined free volume is less than the predetermined capacity.

7. The method according to claim 6, wherein the predetermined capacity is ninety (90) percent and the predetermined free volume is ten (10) percent.

8. The method according to claim 1, wherein prior to the step (c), the method further comprises a step of constructing the at least one repository by drilling at least one pilot wellbore from the Earth's surface to the deep geologic rock formation using at least one drill rig and then forming the at least one repository in the deep geologic rock formation.

9. The method according to claim 8, wherein the forming is done by further drilling and/or by under-reaming.

10. The method according to claim 1, wherein the at least one repository is at least one human-made cavern, at least one substantially lateral wellbore, or the at least one human-made cavern and the at least one substantially lateral wellbore; wherein before the step (e) the at least one repository is fluid pathway linked to the Earth's surface via at least one substantially vertical wellbore.

11. The method according to claim 10, wherein the at least one human-made cavern is constructed by substantially vertical under-reaming operations into the deep geologic rock formation; and the at least one substantially lateral wellbore is constructed from substantially lateral drilling operations into the deep geologic rock formation.

12. The method according to claim 10, wherein when the at least one repository is the at least one human-made cavern, the step (a) further comprises the manufacturing of the plurality of spherical capsules in at least two different external diameters, smaller spheres and larger spheres, respectively.

13. The method according to claim 12, wherein the at least the subset of the plurality of spherical capsules that contain the uranium waste products are of at least some of the smaller spheres and of at least some of the larger spheres; wherein the step (c) comprises the emplacing of the at least the subset of the plurality of spherical capsules that contain the uranium waste products into at least one repository by mixing quantities of the at least some of the smaller spheres and the at least some of the larger spheres such that a total quantity of the uranium waste products received into the at least human-made cavern is maximized.

14. The method according to claim 10, wherein prior to the step (c), the method further comprises a step of lining at least a portion of the at least one substantially lateral wellbore with a casing.

15. The method according to claim 14, wherein prior to the step (c), the method further comprises a step of pumping a cement between the casing and a rock wall of the at least the portion of the at least one substantially lateral wellbore.

16. The method according to claim 10, wherein when the at least one repository is the at least one substantially lateral wellbore, the step (c) further comprises placing plugs at either or both ends of the emplaced spherical capsules.

17. The method according to claim 10, wherein when the at least one repository is the at least one substantially lateral wellbore, the emplaced spherical capsules of the step (c) are of a same external diameter.

18. The method according to claim 1, wherein prior to the step (d), the method further comprises a step of selecting the immersive protective medium.

19. The method according to claim 1, wherein the immersive protective medium comprises one or more of: carbon nanotubes; bentonite clays; bentonite fluids; tars; bitumen; heavy oils; regular cement slurries; specialized cement slurries; foam; foam slurries; foamed cement slurries; foam cement; portions thereof; combinations thereof.

* * * * *